(12) United States Patent
Harvey et al.

(10) Patent No.: US 6,519,568 B1
(45) Date of Patent: *Feb. 11, 2003

(54) SYSTEM AND METHOD FOR ELECTRONIC DATA DELIVERY

(75) Inventors: Diane M. Harvey, Austin, TX (US); Yogendra C. Pandya, Austin, TX (US); Julian C. Anigbogu, Cedar Park, TX (US); J. Thomas Provost, Round Rock, TX (US); Juan C. Alvarado, Cedar Park, TX (US); David J. Scheibner, Austin, TX (US); Sanjay S. Kanvinde, Austin, TX (US); Bruce A. Fogelsong, Georgetown, TX (US); Keith G. Kaan, Mason, TX (US)

(73) Assignee: Schlumberger Technology Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,844

(22) Filed: Dec. 23, 1999

Related U.S. Application Data

(60) Provisional application No. 60/139,171, filed on Jun. 15, 1999.

(51) Int. Cl.⁷ .......................... G06F 17/60; G06F 19/00
(52) U.S. Cl. .................................. 705/1; 705/22; 702/6; 702/14; 709/217
(58) Field of Search ........................... 705/1, 9, 22–23; 702/6–7, 9, 14; 707/10; 709/217–219, 223–224

(56) References Cited

U.S. PATENT DOCUMENTS

| | | | |
|---|---|---|---|
| 4,686,625 A | 8/1987 | Bryan ........................ 364/422 |
| 4,749,990 A | 6/1988 | Birkner ...................... 340/799 |
| 4,876,673 A | 10/1989 | McCowan ................... 367/68 |
| 5,051,962 A | 9/1991 | Eaton ........................ 367/33 |
| 5,237,539 A | 8/1993 | Selman ....................... 367/69 |
| 5,771,170 A | * 6/1998 | Withers et al. ............. 364/421 |
| 5,864,772 A | 1/1999 | Alvarado et al. ............. 702/9 |
| 5,912,883 A | * 6/1999 | Hershberg ................. 370/319 |
| 6,021,198 A | 2/2000 | Anigbogu et al. ............ 380/9 |
| 6,101,445 A | * 8/2000 | Alvarado et al. ............. 702/9 |

FOREIGN PATENT DOCUMENTS

| | | |
|---|---|---|
| EP | 0 398 581 A2 | 11/1990 |
| EP | 0 573 736 A2 | 12/1993 |
| WO | 92/10768 A1 | 6/1992 |

OTHER PUBLICATIONS

Veritas DGC Inc. Announces Successful Testing and Demonstration of Remote Survey Capability for Land Seismic Data Acquisition, May 5, 1999, Business Wire, P0343.*

Applicant: Schlumberger Technology Corporation, Inventor: Michael A. Montgomery, Title: Communications Protocol For Well–Logging Detail Telemetry System, Mar. 18, 1993, International Publication No. WO 93/05600, PCT Application No.: PCT/US92/07564.

* cited by examiner

*Primary Examiner*—James P. Trammell
*Assistant Examiner*—Mary Wang
(74) *Attorney, Agent, or Firm*—Pehr B. Jansson; William Batzer; John J. Ryberg

(57) ABSTRACT

The present invention comprises a data delivery system for delivering oilfield data from an acquisition site to a remote delivery site comprising a central data hub computer that processes a workflow order for controlling delivery of the oilfield data, a data acquisition site computer that transmits oilfield data over a first communications network to the central data hub in near real-time in response to the workflow order and a data server that receives data from the central data hub over a second communications network. The data server communicates with multiple remote delivery site computers for the simultaneous display of oilfield data in near real-time at the multiple delivery site computers in response to the workflow order.

84 Claims, 14 Drawing Sheets

SYSTEM AND METHOD FOR ELECTRONIC DATA DELIVERY

This application claims the benefit of U.S. Provisional application No. 60/139,171, filed on Jun. 15, 1999.

The present invention relates generally to electronically delivering oil exploration and production data from an acquisition site to a delivery site. More particularly, the invention is a global electronic data delivery system and method of use for managing the delivery of oil exploration and production data. The present invention uses a workflow process that manages the flow of data from an acquisition site to a delivery site using a centralized data hub for real-time, point to multi-point data communications that includes a global communications network for secure and efficient data delivery.

BACKGROUND

In the oil and gas industry, operating companies that own and/or manage hydrocarbon wells evaluate the wells by wireline logging. In wireline well logging, one or more tools are connected to a power and data transmission cable or "wireline" and are lowered into the well borehole to obtain measurements of geophysical properties for the area surrounding the borehole. The wireline supports the tools as they are lowered into the borehole, supplies power to the tools and provides a communication medium to send signals to the tools and receive data from the tools. Commonly, tools are lowered to a depth of interest in the well and are then retrieved. As the tools are retrieved, they send data about the geological formations through which they pass through the wireline to data acquisition and processing equipment at the surface, usually contained inside a logging truck or a logging unit.

The data acquisition and processing equipment, including software, compiles the data from the tools into a "log," a plot which presents the geophysical information concerning the geological formations encountered by the well, frequently by depth. Logs can also be used to evaluate current production from producing wells or to inspect the integrity of production equipment in a producing well. In any case, the data gathered during the logging operation is generally presented on the log by depth, but may also be presented by time, or any other index by which multiple physical entries are recorded. The data acquisition and processing software may send the log data to a viewing monitor, where the well logging professional (usually a "logging engineer") conducting the logging operation can view the log as it is being compiled. After the log is compiled, it can be transmitted to the operating company's headquarters for interpretation and review by management.

The data acquired by logging is often crucial to the decision-making process on what will be done with the well being logged. Take, for example, a well that has just been drilled and logged. Depending on the results of the log, the well could be drilled deeper, plugged and abandoned as non-productive or cased and tested—or perhaps the decision will be that additional logs are required before the decision on the disposition of the well can be made. The results of the log may also help determine whether the well requires stimulation or special completion techniques, such as gas lift or sand control. In any case, these decisions are crucial and have to be made very quickly. Mistakes or even mere delay can be extremely expensive.

The operating company which is drilling or producing the well frequently desires to have its own personnel viewing the log data as the well is being logged. But the operating company may be located half a world away from the well itself. Drilling and production activities are often located in remote locations and it is difficult for the operating company to have its own personnel, such as a geologist or petrophycist, join the wireline company's logging engineer on site during the logging operation. Sometimes logistics or severe weather conditions prevent the operating company from sending anyone to the wellsite for the logging operation. Furthermore, sending personnel to wellsites is expensive and exposes them to all of the hazards of the drilling or production operation, as well as the hazards and inconvenience of travel. As a consequence, tentative decisions often have to be made before the operating company can complete its review of the actual logging data, relying solely on the interpretations conducted at the wellsite.

The oilfield operating company may have one or more service partners to provide technology, processes and services that bring increased operating efficiency at reduced costs. Among the partner's needs are the acquisition, processing, management and delivery of quality data.

Each operator has unique views about and preferences for what is needed. These needs vary widely and depend on the work ongoing, and result in a variety of the data to be handled. Some are currently focused on getting real-time data delivered directly to the desktops of all project members (employees, partners and service company experts), while others believe it is paramount to work towards a more comprehensive solution that includes data processing, management and product support. At the same time some operators prefer direct communications links, while others insist on only "pulling" data off of a secure, centralized, company-neutral server. There are as many permutations on the data delivery theme as imaginable based upon technological capabilities, existing infrastructures within both the service company and operator domains, and operator preferences. In some cases, the lack of a standard process for setting up data delivery services causes operators and service companies to miss or even consciously pass up the opportunities presented by the technology.

Further, the world is rapidly assimilating advances in electronic communications and web-based central data hubs demanding ever faster, more secure and reliable transfer of all data types around the globe. The exploration and production (E&P) industry is no exception to this trend. It desires time-efficient data acquisition with real-time and/or immediate post-job interaction with and integration of data to assist with project collaboration and decision-making.

Acquisition sites are often temporary and in remote areas, lacking an established communications infrastructure. It is vital that a contractor's acquisition unit is able to leverage all possible communication methods it may encounter. For example, as many operators extend their Intranets to the acquisition site, contractor hardware must be capable of capitalizing on this, while providing the specific network security required by all parties involved. Transmission protocols designed to get the data from the acquisition site must be able to overcome what is often the least reliable link in the transmission chain. The protocol needs to be robust, efficient and maximized in recovery functionality. The data delivery system must accommodate several different time frames: real-time, post-job and long-term. Standard processes and facilities for creating links to oil acquisition sites and between companies must be established to facilitate use on more and more projects.

World-class data delivery can only be achieved when the data transmitted is of the highest quality and adheres to industry standards. Quality data is critical for making sound decisions and reducing risk. Such data, available as and when required by end users, is a common goal throughout all the data business segments: acquisition, processing, interpretation and management. Data content and composition vary widely, from the numerous industry standards to locally devised data formats. To be truly seamless, a delivery system must handle all formats and data types encountered, converting between these formats if and when necessary.

Likewise, data can only be considered successfully 'delivered' when it is incorporated smoothly into the client's domain and is available for immediate use and decision-making. Thus, software applications must accompany hardware developments to facilitate data reception, handling and manipulation in the user's domain. All data transmitted must be traceable and well managed, if it is to be supported and used efficiently throughout its life.

Many data delivery systems have been established in the past and are in use today. Most have sub-optimal security, and do not offer seamless delivery of real-time data from the acquisition site to the delivery site with an integration of all data streams, do not manage the process workflow of data from the acquisition site to a data center to the delivery site of the data being transmitted, do not allow for point to multi-point near real-time data delivery, do not offer seamless addition of new client/server functionality and do not allow for customized data delivery formats based on client specific profiles.

SUMMARY

The present invention solves the aforementioned needs. It provides an apparatus, system and method that substantially eliminate or reduce the disadvantages and problems associated with the previously developed data delivery systems.

The present invention provides for the seamless delivery of real-time data from the acquisition site (welisite) to the delivery site (client sites) with the integration of all data streams. It integrates the data movement from the wellsite to a centralized data hub, from the hub to data service centers, data management centers, product delivery centers, and to multiple client sites. The present invention manages the process workflow from the producer of the data to the data centers and to the clients. The present invention centralizes the monitoring and traceability of data delivery, provides built-in recoverability of failed operations along with distributed management of the recovery by the end user or administrator. It uses data compression in its delivery applications for improved utilization of communication bandwidth. The present invention comprises an extensible architecture that allows for the seamless addition of new client/server side functionality without impacting the producer of the data. It provides a workflow-based system with capability to provide inter-dependency between the tasks of the workflow. It provides an integrated system that allows for the export of data to data management archival systems. It provides a real-time store and forward capability and customization of data based on client specific profiles. The present invention reduces and simplifies the data delivered, both raw and processed data. It provides for point to multi-point data transfer and communication to a variety of computer platforms, network connections and multiple sites using the central data hub that allows multiple clients to access the same data in near real-time delivered in a variety of client specified formats while at the same time archiving and recording the data and graphics on various client specified media. The present invention provides for the security of the data during the transmission and delivery process on private and public networks.

Each data transmission is a workflow order including the destination and delivery type, for example, deliver by fax to destination A and deliver data file to destination B. The order can specify data conversion and customization based on client profile. The central data hub manages the data delivery and data conversions. The data delivery is point to multi-point thereby allowing near real-time data delivery to multiple clients while the data is being acquired at an acquisition site. A global communications network interface (Internet web-based) provides for the ordering of data delivery from virtually anywhere. Web based monitoring allows for the field engineer (or other clients) to check on the progress of data delivery from virtually anywhere. The centralized hub archives the data delivery results and prevents duplicate delivery and archiving. A transfer protocol with a unique way of using pointers and sockets to interact directly at the TCP/IP level allows for the bypassing of software middleware. The web-based interface allows for automatic software upgrades form the central data hub, including the addition of new software features.

The present invention comprises a data delivery system for delivering oilfield data from at least one data acquisition site to a remote delivery site. The system comprises a central data hub computer that processes a workflow order that controls delivery of oilfield data from at least one data acquisition site to a remote delivery site, a data acquisition site computer that transmits oilfield data over a first communications network to the central data hub computer in near real-time in response to the workflow order and a data server that receives data from the central data hub over a second communications network. The data server communicates with multiple remote delivery site computers for the simultaneous display of the oilfield data in near real time at the multiple delivery site computers in response to the workflow order.

The system further comprises a workflow order generating module in the central data hub computer that allows a user to generate and submit the workflow order to the central data hub computer for processing. The system further comprises a workflow order status monitoring module in the central data hub computer that monitors the status of a submitted workflow order.

The system further comprises a data services center computer for post-acquisition oilfield data processing, the data services center computer being in communication with the central data hub. The system further comprises post-acquisition oilfield data processing software applications within the data services center computer, the software applications being selected from the group consisting of borehole seismic applications, borehole imaging applications, petrophysics applications, well test applications, production engineering processing applications and interpretation functionality applications.

The system further comprises an oilfield data archival database in communication with the central data hub.

In one embodiment, the data server comprises a File Transfer Protocol (FTP) data server for transmitting oilfield data to at least one remote delivery site computer.

In one embodiment, the data server comprises a global communications network ("web") data server capable of transmitting oilfield data in near real-time to the multiple remote delivery site computers via a global communications network.

In one embodiment, the data server comprises a real-time data server for transmitting oilfield data to multiple delivery site computers in near real-time via a third communications network. The third communications network comprises a communications link and a communications protocol. The third communications network may be a global communications network. The communications protocol for the networks may be Transmission Control Protocol/Internet Protocol (TCP/IP) or HyperText Transfer Protocol (HTTP) or a real-time communications transfer protocol.

The first communications network may comprise a satellite communication network, a telephone communication network, a microwave transmission network, a radio communication network and a wireless telephone communication network.

The system further comprises a hardcopy delivery center that generates a hardcopy of the oilfield data as controlled by the workflow order from the central data hub, in communication with the central data hub. The hardcopy is stored on media selected from the group consisting of a hardcopy report, a tape, a film and a CD-ROM.

The central data hub comprises a user interface module that receives a user generated workflow order for oilfield data, a submission module that loads a description of the workflow order and breaks the workflow order into at least one task containing task parameters and task dependencies and transfers the task to a dispatch module for routing the task, at least one application module that executes the routed task, a status module that maintains the task dependencies and monitors task status, a data manager module that enters oilfield data in a database accessible by the central data hub and an archive manager module that handles the export of information for archival. The system further comprises a real-time data transfer module for transmitting real time data as specified in the workflow order from a data acquisition site to a data delivery site. The user-interface module interfaces with a web browser for receiving the workflow order.

The application module of the central data hub computer may comprise a data converter function that provides digital data conversion and data filtering of oilfield data as specified in the workflow order. The application module may comprise a fax function. The application module may comprise publishing the oilfield data to a web server as specified in the workflow order, sending the oilfield data as specified in the workflow order to an external server using an FTP protocol, sending e-mail messages to a computer server as specified in the workflow order, converting data using a data conversion function as required in the workflow order or sending a hardcopy request to a product delivery center.

The computer-implemented method further comprises transmitting oilfield data in near real-time via the data server to the multiple remote delivery site computers via a global communications network where the data server is a global communications network ("web") data server. The method further comprises transmitting oilfield data in near real-time from a real-time data server to the multiple delivery site computers via a third communications network. Processing the workflow order at the central data hub comprises receiving a user generated workflow order for oilfield data at the central data hub, loading a description of the workflow order and breaking the workflow order into at least one task containing task parameters and task dependencies and transferring the task to a dispatch module for routing the task, executing the routed task, maintaining the task dependencies and monitoring task status, entering oilfield data in a database accessible by the central data hub and handling the export of information for archival. The user generated workflow order is received by a user-interface module interfacing with a web browser. The application module executes the routed task, converts digital oilfield data and filters the data as specified in the workflow order, publishes the oilfield data to a web server as specified in the workflow order, sends the oilfield data as specified in the workflow to an external server using an FTP protocol, sends e-mail messages to a computer server as specified in the workflow order, sends a hardcopy request to a product delivery center and sends oil field data in near real-time data from the data acquisition site to the multiple remote delivery sites. Oilfield data is sent in near real-time from the data acquisition site to the multiple remote delivery sites as specified in the workflow order.

In one embodiment, the method in a computer data delivery system for delivering oilfield data from at least one data acquisition site to multiple delivery sites comprises receiving a workflow order for oilfield data at a central data hub computer. The received workflow order at the central data hub computer is then executed. If the task parameters are valid, the task is submitted for dispatch which comprises loading the description of the workflow order, breaking the workflow order into at least one task containing task parameters and task dependencies, if task dependencies are satisfied dispatching the task for execution, executing the task and monitoring task status.

Submitting the task comprises receiving a workflow order request at a submit server within the central data hub, validating the workflow order and placing the workflow order on a dispatch queue. If the workflow order is a task abort request, processing comprises receiving a workflow order request at a submit server within the central data hub, validating the workflow order and placing the workflow order on an abort queue. Dispatching and executing the task comprises processing tasks in a dispatch queue by routing the task to an appropriate application server for execution.

The application server may comprise a digital data conversion and filter application, a web dropbox server for sending data to a web server, a fax application server for sending the oilfield data to a fax machine, a file transfer protocol (FTP) server for sending files to a server external to the central data hub using FTP protocol, a PDS rasterize application server for converting data from PDS graphical formats to other graphical formats and a hardcopy application server for sending a hardcopy requests to a product delivery center. The application server may also comprise a real-time transfer application server that sends data to and receives data from a real-time server. A second real-time transfer application server is located in the data acquisition system for sending oilfield data in real-time to the central data hub. A third real-time transfer application server is located in the remote delivery site computer for receiving oilfield data in real-time from the central data hub.

The method further comprises a data manager within the central data hub that locates data and enters new data into a database in communication with the central data hub and an archive manager for managing file data uploaded to the central data hub and file data generated at the central data hub via file conversion applications. The monitoring of the task status comprises processing status queue task dependencies, task messages and task statistics, maintaining task and order state statistics, identifying tasks waiting for events and placing tasks in a dispatch queue when task dependencies are complete. Task dependencies include executing the task after other tasks have completed or after a period of time has elapsed.

In one embodiment, the computer-implemented method for near real-time data delivery of oilfield data from at least one data acquisition site to multiple remote delivery sites, comprises processing a workflow order at a central data hub computer that controls delivery of oilfield data from the data acquisition site to the remote delivery site, transmitting oilfield data over a first communications network from a data acquisition site computer to the central data hub computer in near real-time in response to the workflow order and sending oilfield data from the central data hub to a remote delivery site using a data server that is part of the central data hub, the data server communicating with multiple remote delivery site computers for the simultaneous display of the oilfield data in near real time at multiple delivery site computers in response to the workflow order.

In one embodiment, the computer implemented method for near real-time data delivery of oilfield data from at least one data acquisition site to multiple remote delivery sites, comprises electronically transferring oilfield data obtained at a data acquisition site from a computer at the data acquisition site, based on a user-specified workflow order program, to a central data hub computer over a communications network using a near real-time transmission protocol, receiving the oilfield data at the central data hub computer, formatting the data for delivery to the multiple remote delivery sites based on the delivery site requirements and the user-specified workflow program, routing the data to a hardcopy delivery site for hardcopy creation based upon the workflow as requested by the workflow and routing the data to the multiple remote delivery sites based on the user-specified workflow over a second communications network using a near real-time transmission protocol upon request by at least one of the multiple delivery sites. The method comprises a built-in data recovery module in the central data hub for recovering data if the transmission of the oilfield data from the data acquisition system to the multiple remote delivery sites fails and a data compression module for compressing data transmitted over the first, second and third communications networks.

The computer-implemented methods are embodied in software programs that may be stored on a computer-readable medium.

BRIEF DESCRIPTION OF THE DRAWINGS

These and other features, aspects and advantages of the present invention will become better understood with regard to the following description, appended claims and accompanying drawings where:

DETAILED DESCRIPTION OF THE DRAWINGS

Figure 1:
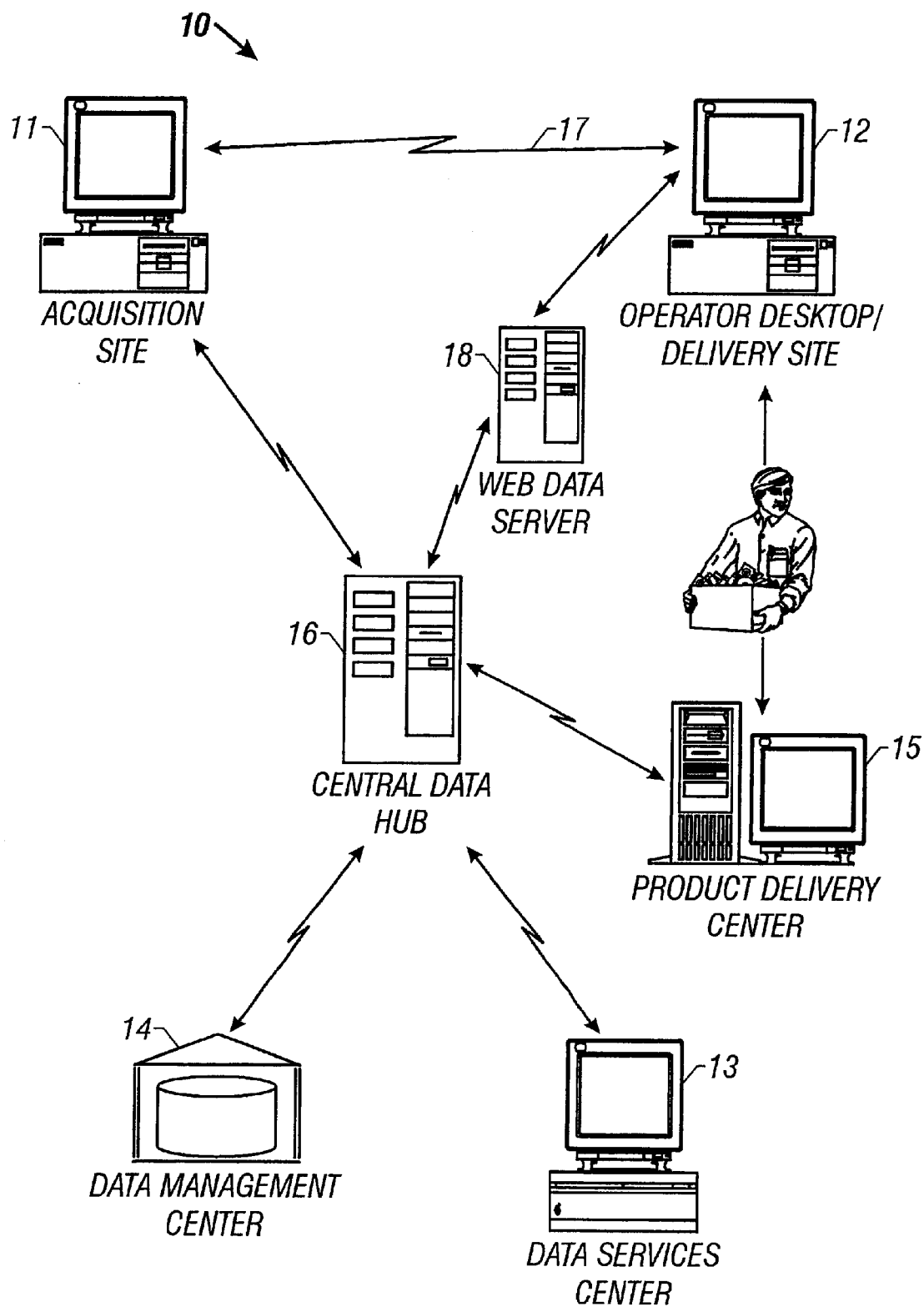
FIG. 1 is a system architecture diagram of the data delivery system.

FIG. 1 is a system architecture diagram of the data delivery system 10. The data delivery system with its framework components has been designed around the data to be handled, the data workflow, the time domains to be accommodated, and the variety of computer platforms and network connections available. Specifically, it has been designed around three main sites or functions: the acquisition site (wellsite) 11, the delivery site (operators' office) 12, and the auxiliary sites such as the data services center 13, data management center 14, and product delivery center 15.

These sites communicate through a secure central data hub 16. Although not explicitly shown in FIG. 1, there may be multiple delivery sites, auxiliary sites and acquisition sites connected to the central data hub 16. The hub 16 receives data and forwards it to the required locations, either to the delivery site 12, to an auxiliary site 13–15 or to the acquisition site 11. The central data hub 16 may be located either within a secure Intranet or within an associated secure enclave. Digital delivery to the delivery site (in this case the operator's desktop) 12 is achieved through the use of data forwarding protocol (File Transfer Protocol or others), e-mail attachment, fax transmission or World Wide Web (WWW) delivery through a web data server 18. The system can also accommodate point-to-point communication 17 directly between the acquisition site 11 and the delivery site 12.

Associated with this central data hub may be at least one product delivery center 15 comprised of specialized hardware and software systems designed specifically to generate hardcopy output in the form of products such as prints, tapes, films and CDs. The product delivery centers 15 may be located local to or in the operators' offices at the delivery site 12 or may be located virtually anywhere, removing the need for products to be generated at the acquisition site. Network transmission to the local product delivery centers 15 greatly reduces product delivery times from remote acquisition sites. The central data hub 16, product delivery center 15 and/or web data server of choice 18 are typically, but are not required to be, co-located within a single data service center. The data delivery framework is flexible and can be configured in a number of ways. There are many permutations on the data delivery theme depending upon the preferences of an operator at project time, as well as the communications configuration of a given acquisition site.

Desktop hardware and software tools located on the operator desktop at the delivery site 12 or on desktops at the data services center 13 complete the data delivery framework system components. The tools facilitate the reception, handling and manipulation of data, received either physically or electronically, and assist the operators with their next step decision process, be that data integration, interpretation, processing or archiving.

Data Acquisition Site

Data delivery from the acquisition site 11, including both measurement data and job status information, may be transmitted over satellite, land line, microwave, ISDN, cell phone, direct Ethernet connection or by any method that supports the TCP/IP protocol. Generally, either the operator or the service company provides communications from the wellsite. In either case, the service company's data acquisition system must include hardware and software to allow it to communicate over any of these various links using standard protocols. Since data files can be written over hours (wireline) or days (for, example, in logging-while-drilling (LWD) operations), the ability to transmit files as they are being created is an essential facet, crucial to timely decision-making.

A router-based mobile connection solution, designed to facilitate connection of the acquisition unit to the most common communications methods encountered ('standard modem' dial-up, ISDN or Ethernet) may be used. Intended for mobile systems that must reconfigure their network connection on a regular basis, it consists of a router, power supplies and connectors, along with a software interface preconfigured and ready to enable any Internet Protocol (IP) based network application. It is designed for users who are not networking specialists and is straightforward to set up and run. The software 'manager' provides network and connectivity information and assists with trouble-shooting, automatically indicating where and when a link has dropped out.

Transmission Protocol

The data delivery system needs to transfer data from the often-remote temporary acquisition site 11 to a site hooked to an established communication infrastructure. The data delivery system includes a robust and efficient communications transmissions protocol, called transfer express that maximizes successful transmission from these sites and provides file transfer capabilities across Transmission Control Protocol/Internet Protocol (TCP/IP) networks. The protocol queries remote file systems and sends and receives file data. It uses a client/server model similar to that used by File Transfer Protocol (FTP), but transfer express provides more efficient recovery and communications operations. If a communications link is lost during sending of a data file, with FTP or email the file transfer is aborted. This requires the entire file to be sent again once the link is resumed. The transfer express system, on the other hand, recovers gracefully. When the communications link becomes available, the transmission will continue from where it stopped. FTP and email are also very inefficient with file size. FTP provides no compression and email often expands the size of attached binary files. The transfer express system provides compression to a maximum of six times, minimizing transmission time and maximizing bandwidth usage. In addition, the transfer express system provides the following functionality:

Real-time Transfers—the transfer express system moves the data to the receiving computer as it is being generated. This allows data transfer from an open file, facilitating the real-time transfer of data during acquisition.

Programmability—A Component Object Model (COM) interface allows the Transfer express modules to be plugged into any Microsoft Windows application. This simplifies file transfer, and provides customized transfer status updates, options settings, and complete error-handling integration into that application.

Data Scrambling—All data moved over the link is scrambled, and is not easily discernible from its original values.

Multiple Platforms—The transfer express system is multi-platform and provides seamless file delivery of both binary and text across UNIX, VAX and Win32 platforms.

Firewall Limitation—The transfer express system limits firewall changes by requiring that the two systems have only one operational TCP/IP link.

Data Delivery Format

Data generated at the acquisition sites 11 and interpretation systems (such as the data services center 13) are delivered in several forms—graphics, in a format called Picture Description System (PDS), and digital data in either Log ASCII Standard (LAS) or Digital Log Interchange Standard (DLIS) format. For logging-while-drilling (LWD) and other drilling data, the Wellsite Information Transfer Standard (WITS) is used either online or in batch transfer mode for real-time or near real-time transfer. WITS data format is based loosely on the Log Information Standard (LIS).

Coupling advances in both downhole acquisition technology and data telemetry technology with the industry's unabated demand for higher resolution information has drastically increased the volume and complexity of the data being acquired. Complex data are delivered primarily in digital format in addition to the graphical data formerly delivered on paper. Categorization and documentation of the data delivered has become increasingly necessary. As part of a client data delivery initiative to categorize data delivered, default classifications include:

Basic Data—Contains the data, usually presented optically, used as is by a broad spectrum of professionals. It is limited in size and is suitable for timely exchange and quick exploitation.

Customer Data—Contains the basic data and the essential minimum data that supplement and supports it. It is suitable for data storage and advanced exploitation by specialists.

Producer Data—Contains, in addition to basic and customer data, data meaningful to the producer of the data.

To allow data delivered to customers to be accurate, comprehensive, consistent, accessible and shareable, data products have been defined that adhere to agreed-upon policies, requirements and standards. A unique data exchange standard, Recommended Practice/Digital Log Interchange Standard (RP66/DLIS) has been implemented. Developed by a group of oilfield industry leaders, including Schlumberger, this data exchange format became an American Petroleum Institute (API) Recommended Practice (RP66) in 1991. The Petrotechnical Open Software Corporation (POSC) adopted it in 1992, triggering its development as a syntactic standard for seismic, drilling and well logging.

The Digital Log Interchange Standard (DLIS) proposes a data schema or model that permits the storage, management and exchange of quality data, as previously defined in the classifications listed above. Through a description of equipment, tool, process and data, the format ensures the traceability required by the E&P industry. It supports a way to classify data for purpose and consequently provides ease of data access. The standard also conveys the software producer's semantics for tool, equipment, process, channel and parameters via official descriptions stored in the specific data record.

DLIS objects (such as tool, equipment, process, channel, and parameter) are identified by dictionary-controlled names. Registering proper names and properties for DLIS objects is a prerequisite to any product development and commercialization. For example, Schlumberger maintains a public version of its Oilfield Services Data Dictionary (OSDD) on the web. It also endeavors to document the products, especially the digital data (rationale, genesis and qualification).

The data delivery format for log graphics is called PDS, which has been designed specifically for log graphics. It is a sophisticated, intermediate-level, device independent, standard graphics protocol used to describe, store and transport log graphics as efficiently as possible. PDS can be stored on tape or disk and can be viewed on screen displays. The end user does not have the capability to change the details of the PDS file; however, the ability to add and remove annotations is possible.

WITS was designed as a joint industry effort sponsored by the International Association of Drilling Contractors (IADC) and is the generally accepted protocol for sharing data among various contractors on a rig. In WITS, standard records are defined to provide data on rig conditions, directional surveys, cementing, basic formation evaluation and other common rig activities. In addition, there is a provision for custom records that allows any kind of proprietary data to be exchanged as long as the data in the records has been agreed on between the sender and the receiver. WITS is an appropriate format for drilling data transmission due to its ability to transfer depth-stamped data efficiently, as soon as it is acquired. This key feature eliminates the need to wait on the last data to be acquired in a bottom hole assembly (BHA) before starting the transmission. It is possible to reproduce the acquisition system database in the operator's office and run any of the acquisition applications remotely for the purpose of viewing and interpreting the data being acquired. The remote user can select and customize the logs to generate any file format with any data that was acquired and transmitted from the acquisition site 11.

Real-Time Interaction

The data delivery system 10 provides for interactive, real-time, collaborative viewing of acquisition site data in the operator's office 12 is a key and growing need in today's E&P industry. This is especially true relative to interpreting critical drilling and logging data, both of which are used for 'next step' formation evaluation and well construction decision-making.

Specifically, drilling mechanics, resistivity and sonic data are delivered in real-time through WITS to facilitate pore pressure analysis for selecting casing points and minimizing fluid loss while drilling. Sonic (Delta-T) data while drilling are delivered to data service centers for integration and correlation with seismic data in order to "put the bit on the seismic map" and update the well plan in real time. LWD data are delivered for real-time integration into a reservoir model for the purpose of geosteering.

Getting the logging information to the right people at the right time and place—wherever they may be relative to the wellsite—may be achieved through point to point communications 17 using an interactive remote witness software package, originally designed for point-to-point (standalone), two way transmission. The interactive software package can use the transfer express transmission protocol for communications allowing it to be used point to point or in conjunction with the central data hub for multi-point transmission. Real-time point to multi-point communication to delivery sites 12 using a web server is described in FIG. 20.

These established real-time services comprise just one facet of the data delivery framework. Real-time communication allows specialists to provide timely expertise on multiple wells worldwide from a central location or multiple locations. Remote witnessing not only provides optimal use of key staff, but also reduces travel costs and personnel exposure to hazardous environments. Further to this, it facilitates capture and dissemination of best practices, with the same staff collaborating on many wells in a specific field or region. Today's model for decision-making is thus becoming expert-centered versus asset-centered, including web-based real time remote witnessing.

Central Data Hub

Welisite data are transmitted with an accompanying work order from the acquisition site to a nearby central data hub 16, which is specifically designed to receive the data and carry out the order. The central data hub 16 hardware and associated software provide fully traceable processing capability for transferring large data and graphics files of any type from one location to another with high reliability and efficient use of bandwidth via compression. Central data hubs may be deployed around the globe in close proximity to data acquisition sites, achieving a global communications network for data delivery.

Central data hubs 16 automate rapid data and product delivery, using multiple electronic delivery methods (fax, FTP, email, WWW) or product delivery centers 15 for hardcopy generation. An order-based processing system allows logical queuing, execution and tracking of tasks. The central data hub 16 also allows the management and update of these tasks by authorized personnel via a web browser. Detailed records of all central data hubs are kept, resulting in a comprehensive audit trail. Data and graphics format conversion is also supported, which can be specified and standardized on a per-operator basis. Resource editors allow users to create, edit and delete resources such as customer, well, fax machine, transfer destinations and the like. It allows the central data hub 16 administrators to create, edit and delete resources such as the dropbox, central data hub, data center and transfer resources. The change context utility allows for the modification of the company/well focus in the session to the central data hub 16. A user editor allows administrators to create, edit and delete user records. A cleanup utility allows administrators to archive old order records and remove file data from the system without the loss of an audit trail. A change applications utility allows administrators to customize which applications are available in the user interface. The change fax routing allows administrators to determine the origin of the fax deliveries, either from the central hub or a remote fax unit of the central data hub 16. The server manager allows administrators to control the back end servers of the central data hub 16.

The central hub hardware 16 typically consists of a high-end PC server with dual processors, dual power supplies, a large capacity Redundant Array of Independent Disks (RAID), a floppy disk, DAT drive, CD-ROM, fax board, and network adapter.

Data Service Center and Data Manaaement Center

The central data hub 16 also provides the means to take advantage of all auxiliary services. Auxiliary services include data service centers 13 for processing and advanced interpretation of data obtained from the acquisition site 11. Auxiliary services also include data management centers 14. As the complexity of evaluation tools and their acquired data increases, and the value of integrating these data is realized, post-acquisition interpretation and processing becomes an integral part of the data delivery framework. Data service centers 13 exist to process newly acquired data to various levels and/or perform reservoir and formation evaluation field studies on data of any vintage or from any source. Staffing of a typical data service center includes a mix of log analysts and interpretation experts qualified in the major geoscience disciplines.

Data service center 13 hardware systems typically center on a Unix OS Sun Microsystems or Silicon Graphics workstation network. The range of software applications available is extensive, encompassing borehole seismic, geology, borehole imaging, petrophysics, well test, and production engineering processing and interpretation functionalities.

The data management center 14 is an integral part of the data delivery framework and integrates data from the different domains (seismic, drilling, production, reservoir). The data may be either recently acquired or pulled from archive in order to exploit the knowledge from data previously acquired, and benefit from the experience provided as part of the data management center 14. The data management centers 14 allow for the combination and correlation of trusted data among multiple wells and disciplines.

Figure 2:
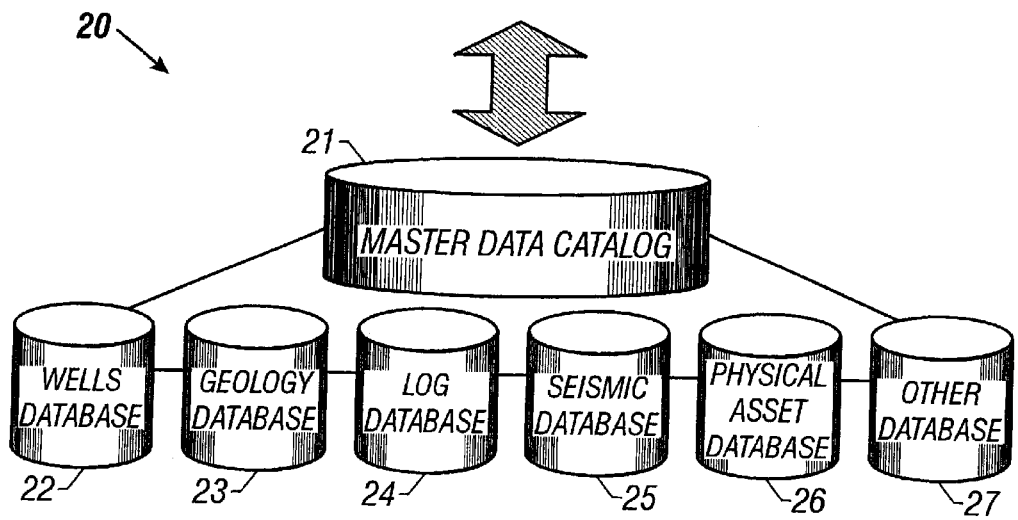
FIG. 2 shows the data management system architecture.

FIG. 2 shows the data management system architecture 20. The data management center (FIGS. 1, 14) contains a master data catalog 21, a wells database 22, geology database 23, comprehesive well log database 24, a seismic database 25 for data from a seismic data management system (for archiving, viewing and restoring bulk seismic data), a physical asset database 26 along with other databases 27. The data management center contains a record inventory management system that allows oil companies to store, organize and track a wide variety of physical E&P data assets. Users may utilize a Web access application to browse, select and retrieve data in all supported formats to a local machine, for example, a data processing work station. The data management system architecture 20 has been designed around the data management and data access functions: loading, validation, editing and integration; find, access and transfer, respectively.

How the data management process integrally ties to the data delivery framework can be shown using an example from the database management system developed for log data (wireline or LWD) data. The data delivery system (FIGS. 1, 10) periodically copies log data files (DLIS and PDS) from the central data hub 16 to the data management center 14 with its archive system using a communications protocol, such as the transfer express protocol, together with a descriptive text file. The log database receiver in the data management center 14 processes then parses the description file to retrieve log data files to be loaded and archived. During the autoloading and archiving process, the database system continually updates a HyperText Mark-up Language (HTML) report, which the operator at the delivery site 12 consults via the central data hub 16.

For graphical data management, a PDS scanner is implemented within the database management system (FIGS. 2, 20), in order to extract the field and well names from a PDS tape. This improves the accuracy of the information put in the log database when a PDS is loaded. After the PDS and the DLIS tapes have been autoloaded, they may be archived according to the archiving policy defined in the log database (FIGS. 2, 24).

Web Data Server

Turning back to FIG. 1, in order to provide timely data to a large, global audience, the Internet and more specifically the World Wide Web (WWW) is being utilized. A platform independent software package facilitates the delivery of digital and graphical wireline logs that have been converted and transmitted from the central data hub 16 to a web data server 18 to operators at a delivery site 12 via the WWW.

Figure 3:
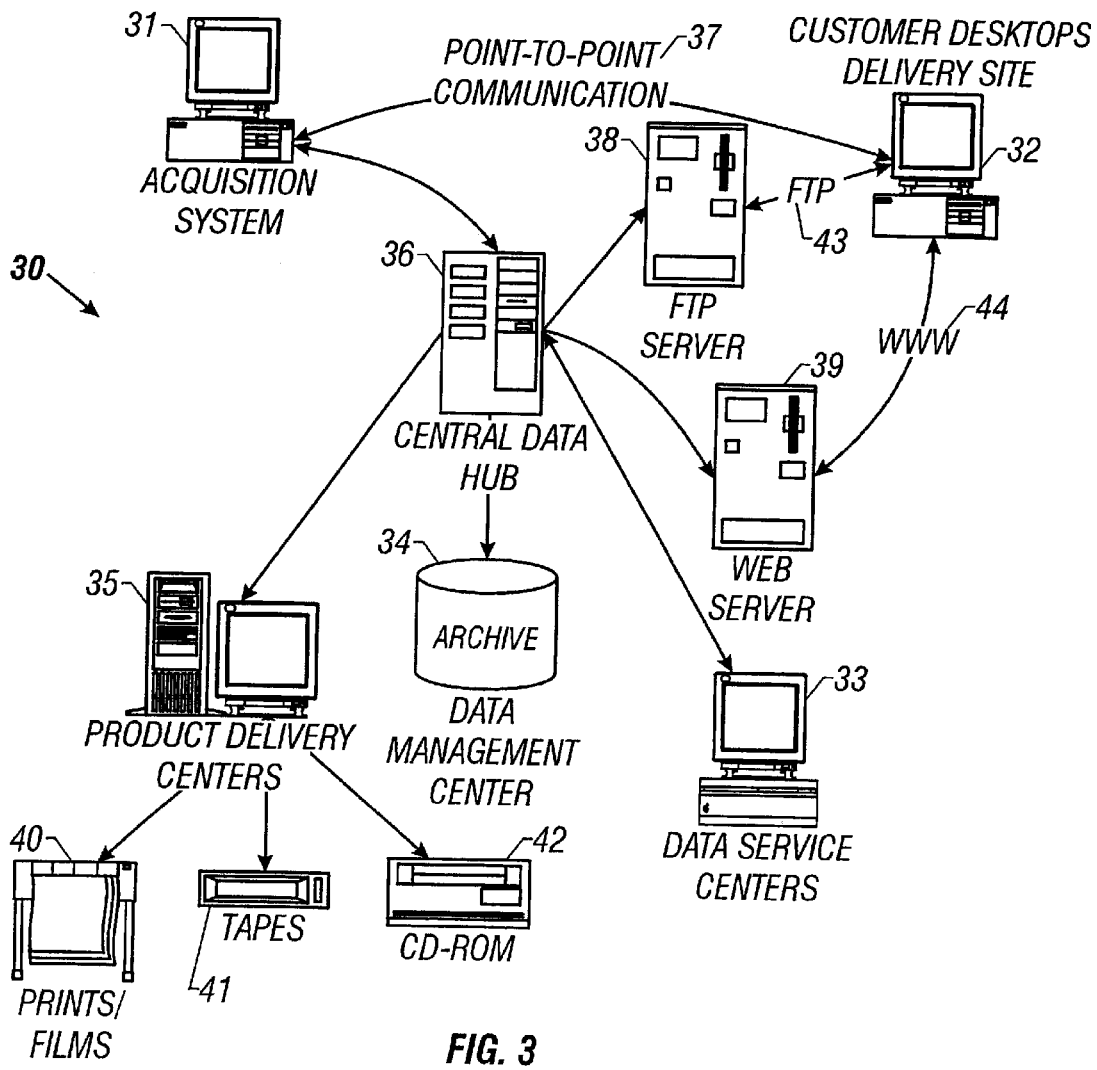
FIG. 3 is a system architecture diagram of an alternate embodiment of the data delivery system.

FIG. 3 is a system architecture diagram of an alternate embodiment of the data delivery system 30. The data delivery system 30 features an acquisition system 31 at a well acquisition site, point to point communication 37 between the acquisition system 31 and operator desktops at the delivery site 32. The data delivery system 30 also features a central data hub 36 for accepting wellsite data transmitted with an accompanying work order from the acquisition site 31 to a nearby central data hub 36, which is specifically designed to receive the data and carry out the order. Data service centers 33, data management centers 34 for archiving data and product delivery centers 35 as discussed above for FIG. 1 are also provided. The product delivery centers 35 provide for hardcopy (prints) 40, tapes 41 and CD-ROMs 42 and the like of the well acquisition site data. When transmitting data from a well acquisition site 31 to the central data hub 36, the engineer can select as the delivery vehicle an FTP data server 38 which communicates with the operator desktops 32 (delivery site) using File Transfer Protocol (FTP) communications 43. Alternatively, the engineer can select as the delivery vehicle a web server 39. One type of communication that can be used with the web server 39 is a secure operator web 'drop box' that accepts data from the central data hub 36. Associated with this drop box 39 is a notification list for the end user, which captures data processing parameters, the data format delivered, and any customization filters specified by the operator. Prior to delivery to the drop box 39, emails are sent to the end users at the delivery site 32 advising of an impending delivery. The central data hub 36 waits for the completed delivery of the logging data from the acquisition site 31, and then automatically delivers it to the specified web data server drop box 39. Subsequently, a final automatic email notifies the user that the data is available for downloading. An alphanumeric pager may be used in place of email as a means to notify the end user of data posted in the drop box.

Figure 4:
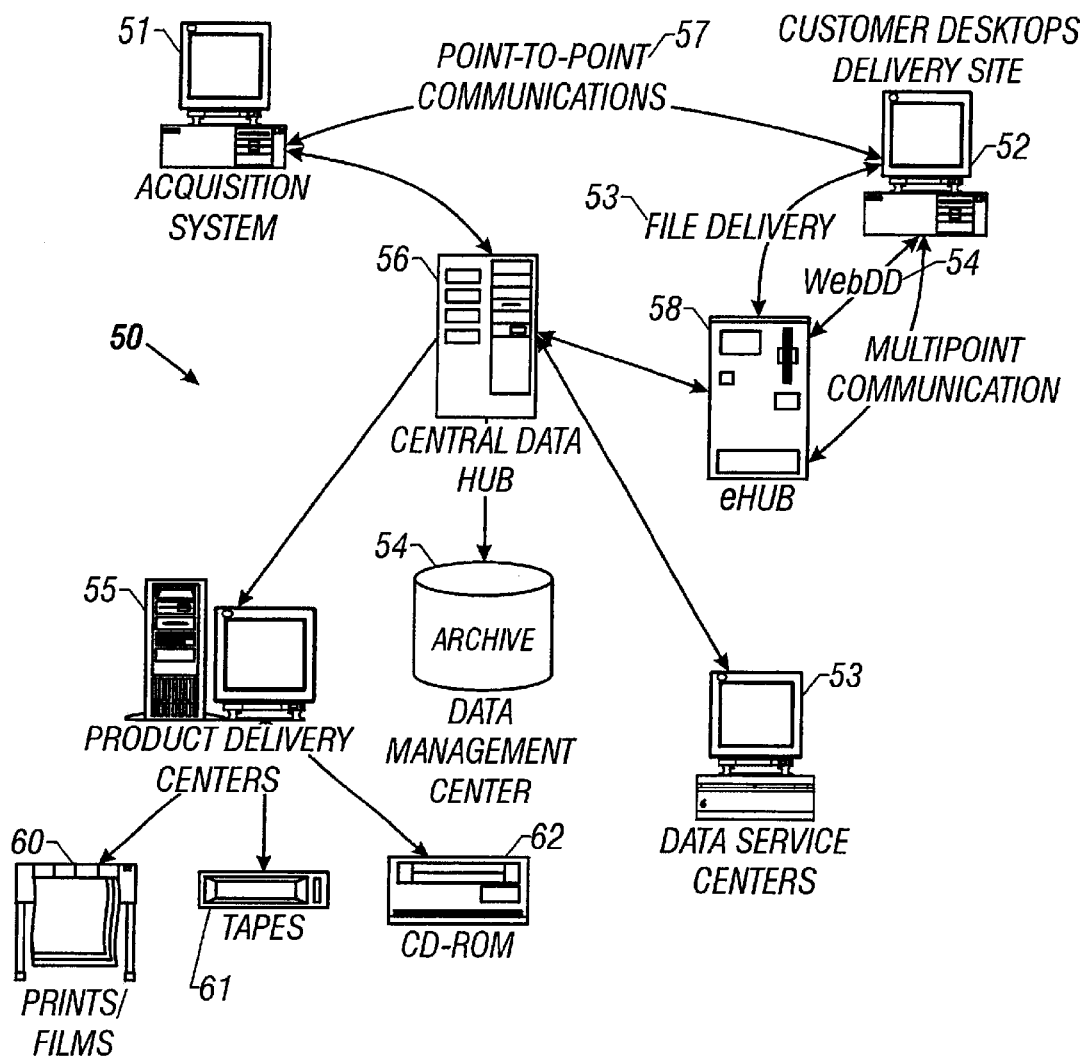
FIG. 4 is a system architecture diagram of an alternate embodiment of the data delivery system.

FIG. 4 is a system architecture diagram of an alternate embodiment of the data delivery system 50. It features an enhanced web-based delivery system built to handle E&P data. The data delivery system 50 features an acquisition system 51 at a well acquisition site, point to point communication 57 between the acquisition system 51 and operator desktops at the delivery site 52. The data delivery system 50 also features a central data hub 56 for accepting wellsite data transmitted with an accompanying work order from the acquisition site 51 to a nearby central data hub 56, which is specifically designed to receive the data and carry out the order. Data service centers 53, data management centers 54 for archiving data and product delivery centers 55 as discussed above for FIG. 1 are also provided. The product delivery centers 55 provide for hardcopy (prints) 60, tapes 61 and CD-ROMs 62 of the well acquisition site data. Data is transmitted from a well acquisition site 51 to the central data hub 56 and then sent to an electronic hub (eHub) web data server 58. The eHub 58 is the single point of entry for web-based data delivery from the operator's desktop at a delivery site 52 and subsumes the functions of the FTP server and web data server (FIGS. 3, 38 and 39). The eHub 58 provides a security framework, administration and delivery protocol (HTTP). The eHub 58 provides for file delivery 53 to the operation desktop 52. File delivery 53 has been modified to allow for real-time data delivery. The eHub 58 also hosts a Web Data Delivery (WebDD) software application that forwards real-time oil drilling data 54 to the operator desktop at the delivery site 52. The Web Data Delivery software application allows customized formatting and views of the data in real-time. A set of base services is provided at the eHub 58 with the extension of custom applications available. The eHub 58 also allows for multi-point communications 59 between the eHub 58 and multiple operator desktops at the delivery site 52. The multi-point communications allow the engineer to send well data from the acquisition site 51 to the eHub 58 where multiple clients can then pull the data onto their customer desktops 52 simultaneously. Alternatively, the engineer can send the data to the customer desktop using point to point communications 57 but to have the data viewed by multiple clients, multiple sessions and point to point communication links 57 are necessary.

Referring now to FIGS. 3 and 4, both the eHub web data server 58 and the web data server 39 are an online repository for all data accumulated during well construction. It allows operators immediate access to their data and reports, and the status of ongoing services, regardless of where in the world these services are taking place. Morning reports, bit run summaries, logs and real-time data files will be published on the server for web access by authorized operator personnel. The files are organized into a hierarchy that allows clients to browse and download data as required. Operators will be able to access all information pertaining to a well (or nearby wells) required to make critical decisions from any location having web access. Through real-time access, decisions may be made that affect the actual placement of the well being drilled.

Several eHub 58 or web 39 data servers may be established, allocated to specific operators, and positioned close to the operator's domain. This allows data to be 'pulled' from the web data server by authorized operator personnel, rather than being 'pushed' into the operator's site. The end user at the delivery sites 32 and 52 thus has control of when and where the data are delivered.

All data and requests are transmitted through the eHub 58 and web data server 38 using a tiered security system using secure Internet protocols (HTTPS). The user only has to 'go' to one location to obtain data or monitor job status. Once the user has 'bookmarked' the location of the nearest eHub web data server 58, it becomes his or her source for current or archived data.

The eHub 58 and web 39 data servers incorporate the following features:

Operator Log-in Authentication—Users are registered in an industry-standard Lightweight Directory Access Protocol (LDAP) database that identifies their company, their organization, and the data they are allowed to access. Once authenticated, the user has access to all data and services permitted under his given profile. User log-in will be controlled using digital certificates (or secure passwords) that verify user identity.

Standard Browsers—The interface to the web data server is via standard browsers (Netscape or Internet Explorer). 'Plug-ins' or Java applets can be used to provide enhanced finctionality, removing the need for special software for basic download capability.

Customization—Within the integrated framework, it is possible for custom displays and applications to be run (such as specific applications and displays for well logs or seismic coverage graphs for seismic work, among others).

Referring now to FIGS. 1, 2 and 3, the product delivery center (PDC) 15, 35, 55 is a dedicated, offsite facility staffed with specialists that comprises the hardware and software specifically needed to produce hardcopy end products such as prints and films, tapes and CDs. Workflow is automated through the system, including the PDC. Although the inherent quality and finalization of the product remains the sole responsibility of the acquisition engineer, the offsite product generation allows the engineer to leave the acquisition site earlier. The PDC is designed to capitalize on the efficient flow of transmitted data from the acquisition site via the central data hub 16, 36, 56, but its benefits can also be leveraged even when configured stand-alone through the physical delivery of data tapes.

In addition to a standardized, engineered solution for product delivery, the PDC also offers a queuing capability. The authorized acquisition engineer or manager can log into the central data hub at any time and monitor the status of the submitted order. As with the central data hub, order traceability is available.

Product delivery center hardware consists of a PC server with CD-ROM, internal DAT drive, network adapter, a scalable array of printer front-end PCs and high-speed color log printers. Label printing facilities exist for both the CD-ROM and DAT media.

CD-ROM production provides operators with an alternative to tape delivery, with an improved shelf life and higher endurance to temperature, humidity and magnetic fields. CDs provide an easy-to-use solution with cross-platform compatibility. Written following the widely accepted ISO-9660 standard, CDs can be read back on nearly any computer platform. In addition, PDC-written CDs provide a consistent product to operators.

Referring now to FIGS. 1, 2 and 3, the data delivery framework has been designed to allow operators 12, 32, 52 to receive data both at home or in the office. An end user is only required to have a basic PC with either a network connection or a CD or tape drive. Several software utilities have been compiled into a 'tool box' utility to facilitate the reception, handling and manipulation of electronic log data received either real-time or post-job, facilitating the decision-making process.

This basic utility package offers graphic data viewing and annotation for PDS as well as functionality to convert PDS to the more general graphic formats encountered in the industry. For digital data, the package provides data information viewers, DLISView and LASView, both of which work in real-time. Digital converter functionality is also included to convert DLIS to both Log Information Standard (LIS) and LAS. The desktop tool package also includes digital data file summary listing functionality.

More specifically, the desktop tools utility package is comprised of the following utilities:

Viewer utilities to view, annotate and print log graphic files. Printers may be HP350C, HP450C, HP650C, HP750C, EPSON Stylus 1520, EPSON Stylus 3000, Printrex 820DL and Canon BJC-80. Proprietary printers are also supported when driven by WinNT4 systems.

Converter utilities to allow PDS graphic files to be converted into nonproprietary formats, namely Graphics Interchange Format (GIF) and Computer Graphics Metafile (CGM). The ability to convert Microsoft Windows Metafile Format (WMF) files to PDS is also included, allowing non-log graphics to be added to a PDS file.

Data utilities for examining the DLIS data files while they are being received, and converting them real-time into LAS or LIS format. Also available are a real-time DLIS Info Viewer and ASCII Viewer, and a LAS certification program.

Real-time viewing utilities (for example, Schlumberger's InterACT 3.0) allow for the real-time viewing of selected data types (PDS, DLIS, ASCII and the like) and immediate two-way communication with the wellsite (via keyboard, verbal or visual).

Figure 5:
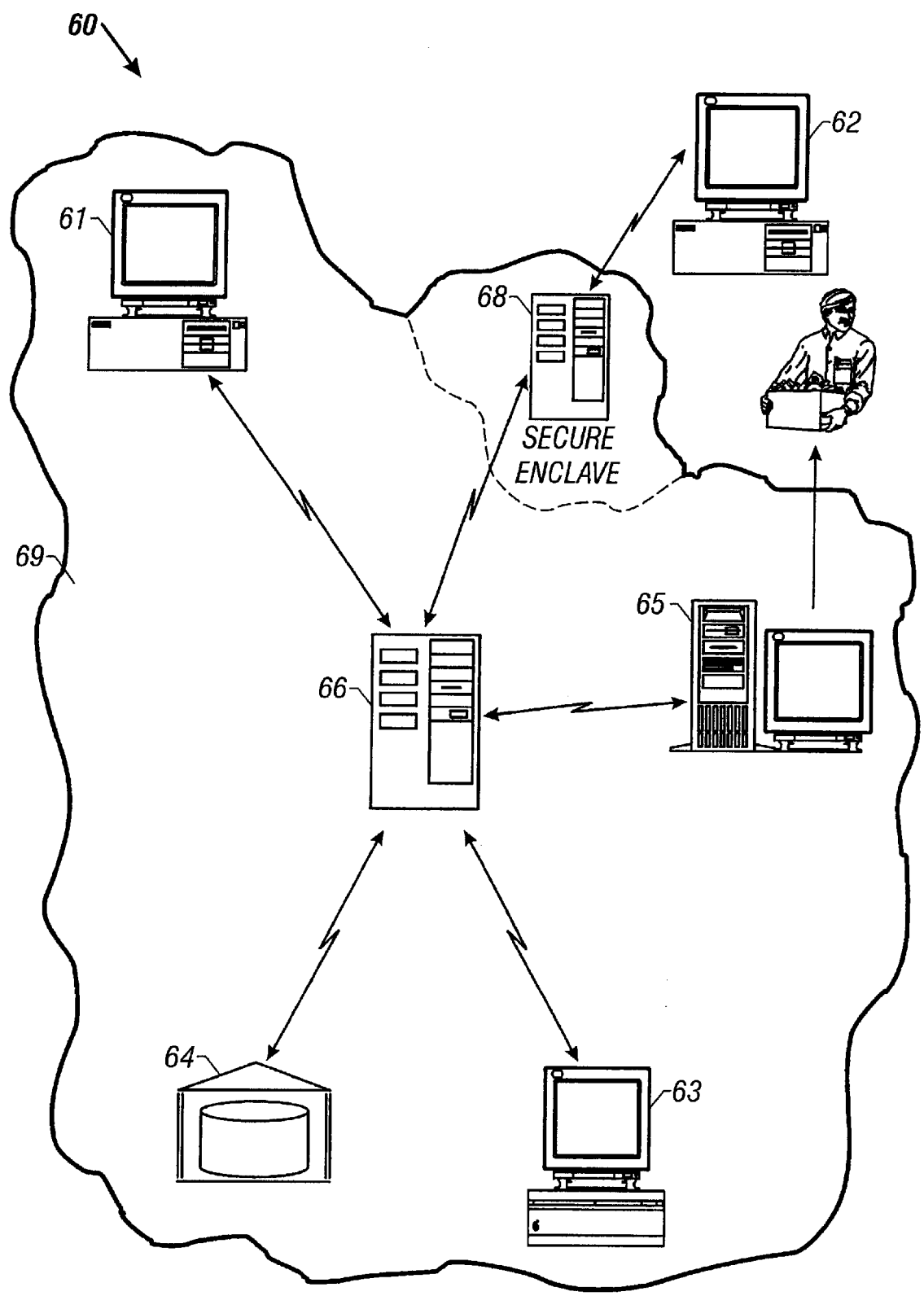
FIG. 5 is a system architecture diagram of an alternate embodiment of the data delivery system.

FIGS. 5 through 9 show alternate configurations for implementing the data delivery system. The data delivery system 60 of FIG. 5 shows a central data hub 66 and acquisition site 61 within a private communications network 69, such as an Intranet. In this embodiment, the data management center 64, data services center 63 and product delivery center 65 are also contained within the private communications network 69. Data delivery to an operator at a delivery site 62 occurs via a web data sever 68 located in a secure enclave.

Figure 6:
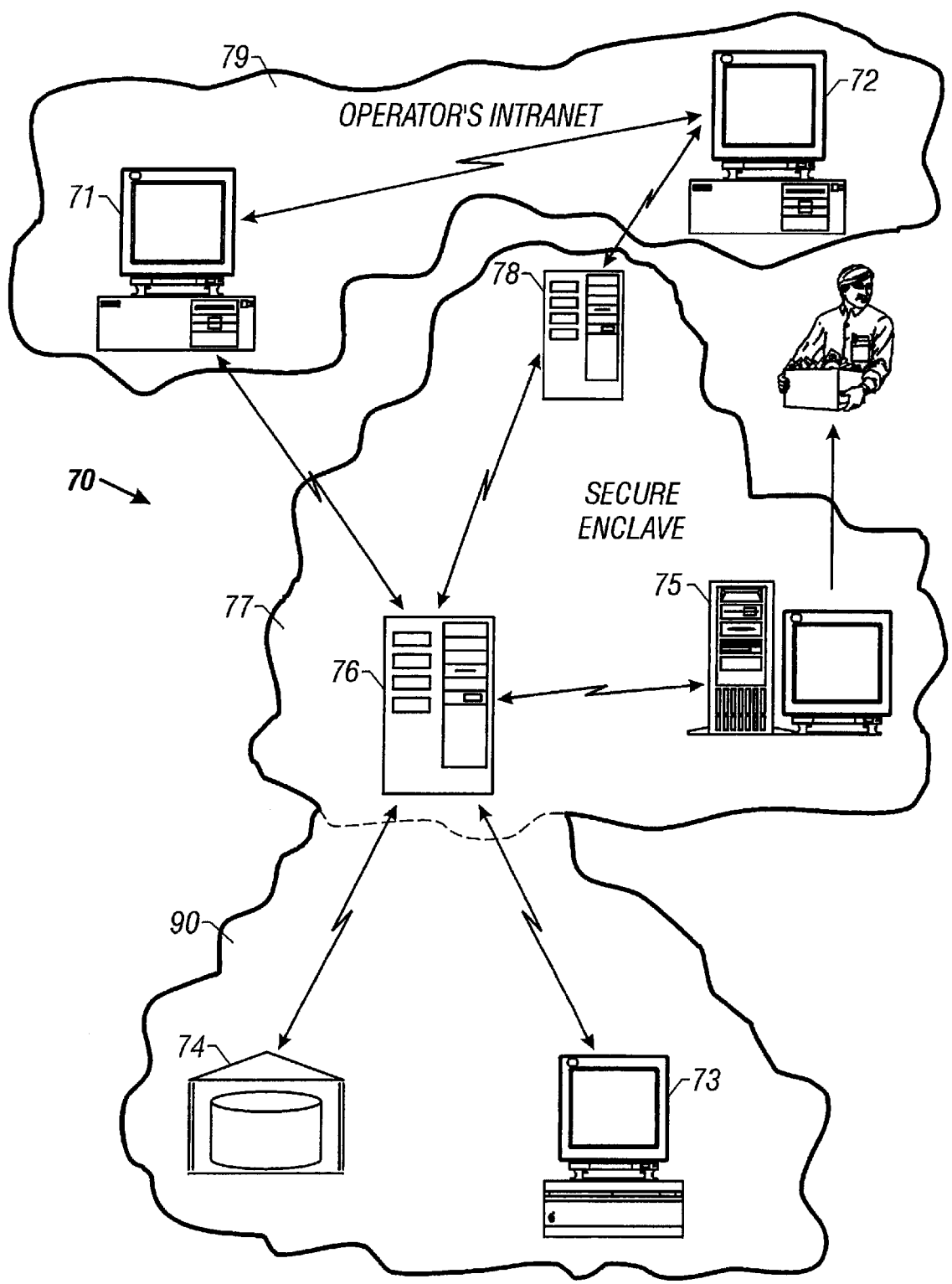
FIG. 6 is a system architecture diagram of an alternate embodiment of the data delivery system.

FIG. 6 shows a data architecture diagram of an alternate embodiment of the data delivery system. The data delivery system 70 of FIG. 6 shows the acquisition site 71 and the operator's delivery site 72 within the same Intranet network 79. The central data hub 77, the web data server 78 and the product delivery center 75 are located within the same secure enclave 77. The data management center 74 and the data services center 73 are located within an Intranet 90. In FIG. 6, data are transmitted to the central data hub 77 that resides in a secure enclave 77 on the edge of the Intranet 90. The data are then sent to the operator at a delivery site 72 via FTP or fax, or they are made available for the operator at the delivery site 72 to 'pull' from the web data server 78. This delivery can be facilitated by a physical connection from the operator's Intranet 79 to the central data hub 78 or by a Virtual Private Network (VPN).

Figure 7:
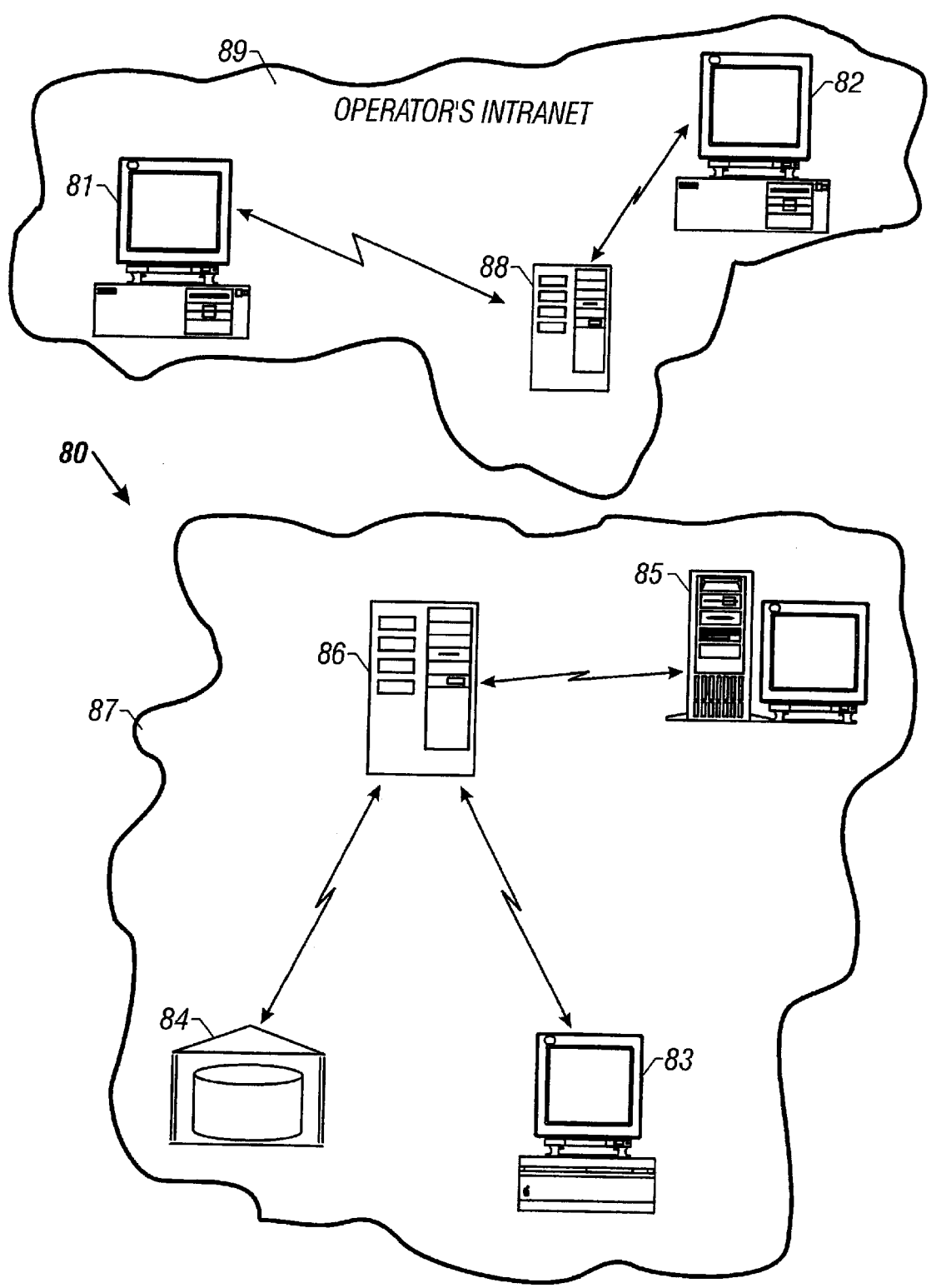
FIG. 7 is a system architecture diagram of an alternate embodiment of the data delivery system.

FIG. 7 shows a data architecture diagram of an alternate embodiment of the data delivery system. The data delivery system 80 of FIG. 7 shows the acquisition site 81 able to transmit data directly to the web data server 88 which in turn allows the operator at a delivery site 82 to access that data through the web data server 88 through the operator's intranet 89. In this configuration there is no access from the data acquisition site 81 to the central data hub 86, product delivery center 85, data management center 84, data services center 83 which are located within their own private network 87. In this case, data are delivered directly from the acquisition site 81 to a data web server 88 located inside the operator's Intranet 89. The advantage of this scenario is that the operator's data does not leave its own Intranet 89. The disadvantage, however, is that delivery to partners networks or to third parties for processing or data archiving is not immediately available.

Figure 8:
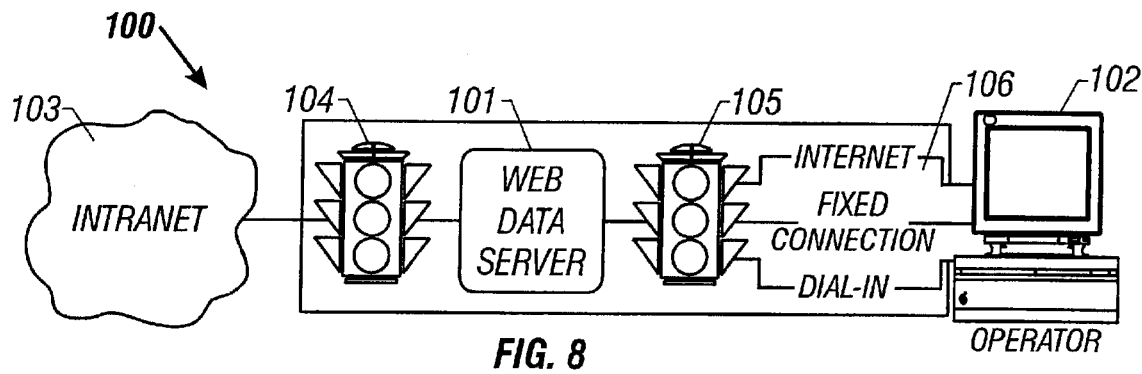
FIG. 8 is a diagram of an exemplary secure enclave connectivity center.

FIG. 8 shows a secure enclave connectivity center 100. The connectivity center 100 hosts a web data server 101 through which operators 102 at delivery sites can access oilfield data. Operators 102 can securely access a variety of services through a single centrally managed connection. Access can be granted to the web data server 101, which may be in turn connected to an Intranet 103 through a firewall 104. The web data sever 101 is connected to the central data hub as shown in FIGS. 1 and 3. There are a number of methods that can be used for connecting from an operator's network 102 to the connectivity center 100. These include, but are not limited to dial-up connectivity (ISDN or phone line), and dedicated access (connection to the SCC via frame relay, T1, fractional T1, or ATM) 106. All connections to the connectivity center are directed through firewalls 105 that are monitored for non-contracted traffic, configured to allow the operator and their partners to access designated hosts and services. The use of the connectivity center 100 allows an acquisition site (located within an operator's Intranet) to connect to the central data hub thus facilitating robust and efficient data delivery.

Figure 9A:
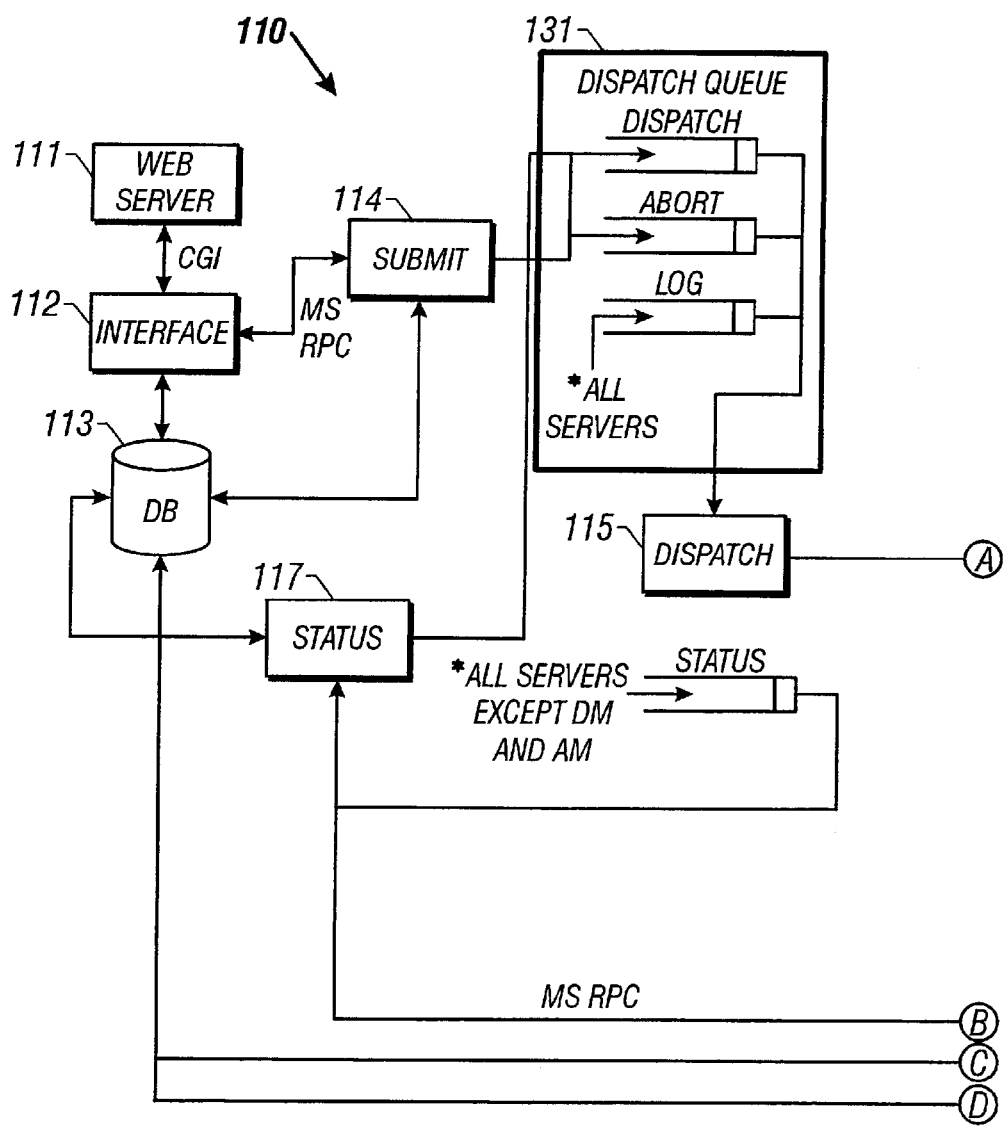
FIG. 9 is a diagram of the central data hub architecture and interfaces.
Figure 9B:
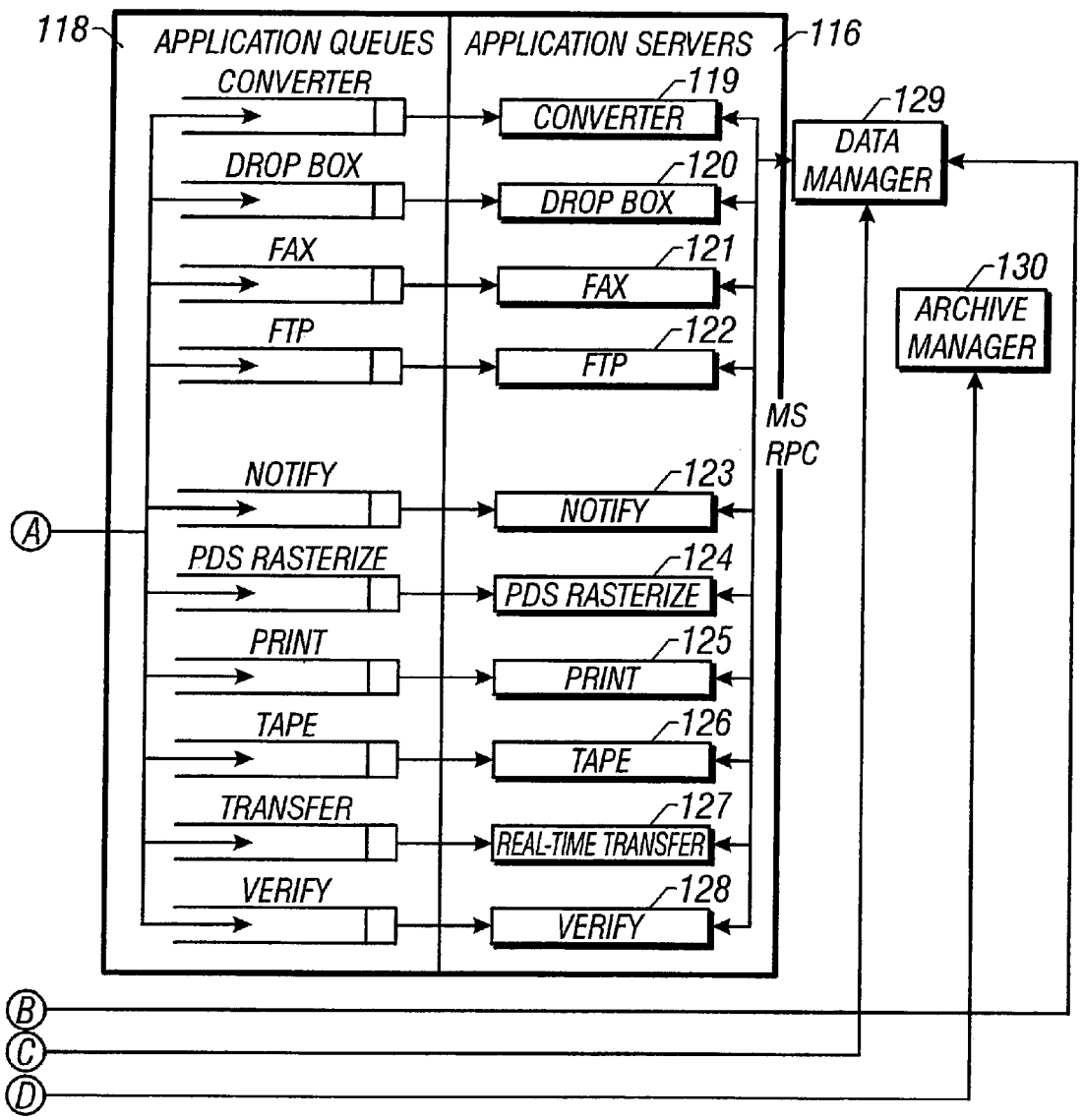

FIG. 9 is a diagram of the central data hub architecture and interfaces and illustrates the workflow order processing within that architecture. The central data hub 110 has core servers that support application execution (such as submit, dispatch, data and archive mangers, and status servers) and application servers that do the necessary work (such as file transfers, faxes and the like).

The central data hub system 110 is divided into two major areas, front end and back end. The front end handles all user interaction (order preparation, submission and monitoring, resource management, and administrative interfaces), and is comprised of the web server 111 and the Interface executable component 112. The back end includes all the remaining components and is responsible for executing data delivery operations. The architecture is designed to support the creation, submission, monitoring and archival processing of oilfield data over a variety of communication means, including a global communications network such as the Internet (known as the world wide web (www)).

The end user, via a standard web browser, interacts with the central data hub web pages hosted by web server 111. The web server may be an Internet Information Server (IIS) which is a group of Internet servers (web, HTTP, FTP and Gopher) that operate with Microsoft's Windows NT server operating server, or the like. These web pages on the web server 111 make use of the Interface executable 112 which in turn relies on a database (such as Oracle) 113 to determine what to present to the user, and to store the commands specified by the user. For example, a user will prepare an order to initiate some data delivery operations and the user interacts via the web pages, the list of available data delivery options presented to the user is derived from information stored in the database. When the user builds a data delivery order, the description of the order is stored in the database as well 113. At some point the user is satisfied with the information contained in the delivery order, and decides to submit it for processing. This is the critical moment when an order transitions from the front end to the back end; it goes from being a static description in the database to a dynamic executing entity in the workflow back end.

The gateway to the back end is the Submit server 114. When the user selects the Submit button on the web page hosted on the web server 110, the Interface executable 112 issues a Remote Procedure Call (RPC) to the Submit server 114 indicating that the order is to be executed. The Submit server 114 loads the description of the order from the database 113, breaks up the order into the constituent tasks, verifies that each task is properly defined (e.g. check task parameters for validity, etc.), and if all is proper, places each task in the Dispatch queue 131. The dispatch queue 131 contains queues for orders to be executed (dispatched), aborted and logged.

The Dispatch server 115 services the Dispatch queue 131. This server 115 is primarily a routing agent that takes a task from the Dispatch queue 131 and, if ready for execution, places it in its appropriate application queue 118 for execution by an application server 116. A task is ready for execution when all its dependencies are satisfied. For example, a task may be setup to execute after another task completes, or after a specified period of time has elapsed (more details on dependencies will be given in the discussion on the Status server 117).

There is one application queue 118 for each application server 116. These servers do the actual "useful" work in data delivery (i.e. transfer files, send e-mails, faxes, etc.). When the Dispatch server 115 places a task in an application queue 118, it is ready to be executed. However, it still needs to wait for an available execution agent (thread) in the application server 116 to begin processing. The purpose of this arrangement is to limit the load on the system. Application servers 116 are initialized with a fixed set of agents. Each agent can only work on one task at a time, and when task execution completes, the agent goes to the application queue to retrieve the next available task and begin working on it. Thus the central data hub 110 limits the number of simultaneously executing tasks for each application. A description of each application server 116 follows.

The converter application server 119 provides digital data conversion, including mapping between various file formats (DLIS, LIS, LAS, TIFF, and the like) and data filtering (reducing the number of data channels in a file to customer's specifications). The dropbox application server 120 manages the publication of files to the dropbox web server, which is accessed by customers to retrieve data over the Internet. The fax application server 121 sends a graphics raster file generated from a PDS file to a specified fax machine. The FTP application server 122 sends a file to an external server using the FTP protocol. The notify application server 123 is used to send e-mail messages, with optional attachments. The PDS rasterize application server 124 provides data conversion from PDS to other graphical formats (G3 raster files used for faxing, GIF, CGM and the like). The print application server 125 sends a print request to a specified Product Delivery Center (PDC). The tape application server 126 sends a tape production request to a specified Product Delivery Center (PDC). The real-time transfer application server 127 sends or receives files from a real-time server (such as Schlumberger's transfer express server). The transfer application server supports real-time, recoverable, efficient file transfer operations. A real-time transfer application server 127 is present in the data acquisition system, and in some data delivery destinations such as for example the eHub. The real-time transfer application server 127 supports the real-time data transfer of data from the acquisition site and the client delivery sites. The real-time server also supports data being forwarded from the central hub, if the destination where the data is being forwarded from is running a real-time transfer software application such as Schlumberger's transfer express. The real-time server 127 allows establishing a real-time file transfer chain from an acquisition system to a real-time transfer-enabled data delivery destination. The verify application server 128 generates a verification listing from a DLIS file. The listing is a human-readable document detailing the contents of the log file.

Application servers 116 interact with the Data Manager server 129 to locate files in the central data hub system 100 and to enter information about new files added to central data hub 100. The Data Manager provides access to the file database 113 for all applications. For example when a file is uploaded into central data hub 100, the real-time transfer application server 127 notifies the Data Manager 129 and includes the context in which the file was uploaded. The Data Manager 129 stores information about the new file in the database 113. When an application server 116 such as Fax 121 wants to locate a file (e.g. a G3 raster file), it communicates with the Data Manager 129 as well: it gives the Data Manager 129 the unique ID of the file and receives the full information about the file, including its location in the file system through the Data Manager 129. The Data Manager 129 together with the Archive Manager 130 manage file data uploaded to the central data hub 100 or generated at the central data hub via file conversion applications.

The Status server 117 is responsible for maintaining task status and supporting task dependencies. Every task in central data hub 100 goes through a well-defined set of states as it progresses through the workflow of the system. This state is visible in the user interface and is used heavily for monitoring and administration. As each application server 116 handles a task, it sends a message to the Status queue notifying the Status server 117 that a task has entered a particular state. The Status server 117 reads the message from the Status queue and updates the database 113 with the new task state information. The Status server 117 also updates the task status with other kinds of information, such as messages and progress reports. This information also arrives from various servers through the Status queue. In addition to keeping up the task status, the Status server 117 supports task dependencies. When a task is received by the Dispatch server 115 and it has an unsatisfied dependency, the Dispatch server 115 discards the task message and sends a message to the Status queue indicating that a task is waiting for a dependency to be satisfied. The Status server 117 keeps track of all tasks that are waiting for dependencies, and will place them back into the Dispatch queue 131 when the dependency conditions have been met.

In addition to task dispatching, the Dispatch server 115 also supports log messages. The central data hub 100 keeps detailed logs of all activity in the system in the form of text files. The generation of these text files is centralized in the Dispatch server 115. The Log queue as part of the Dispatch queue 131 is used by all system components to notify the Dispatch server 115 when a message needs to be placed in a given log file. The Dispatch server 115 reads from the Log queue and routes received messages to the appropriate file.

The Archive Manager server 130 handles the exporting of files to archive systems. The Archive Manager hosts special archival applications that export file data from the central data hub to external databases. For each archive system type, there is an agent in the Archive Manager server 130 that periodically scans the central data hub database 113 for new files to be archived. It sends a message to the archive system 130 describing the data and then transfers the files.

Figure 10:
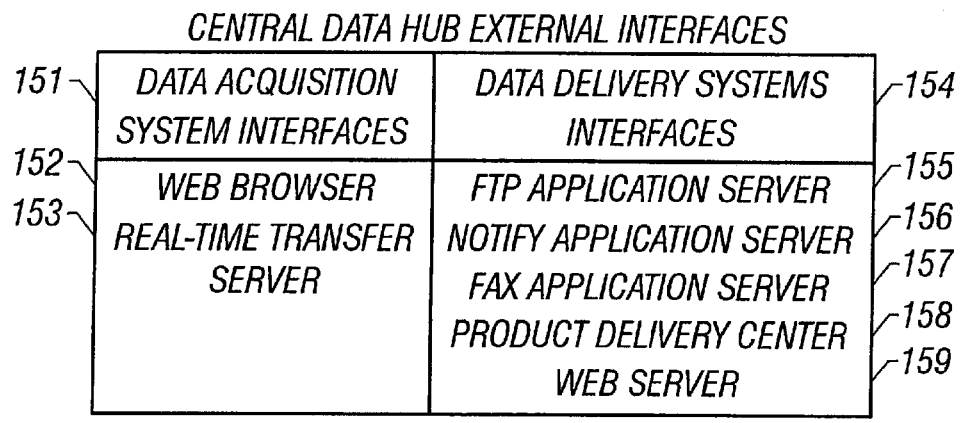
FIG. 10 is a table of central data hub external interfaces.

FIG. 10 is a table of central data hub external interfaces. The data acquisition system interfaces 151 between the central data hub include a web browser 152 that interfaces with the web server and is used to navigate the web pages and a real-time transfer server 153 interface that interfaces with the real-time transfer application server and is used to upload/download files in near real-time. There are data delivery system interfaces to the central data hub 154. An FTP server interface 155 interfaces with the FTP application server and is used to deliver files using an FTP protocol. A Simple Mail Transfer Protocol (SMTP) server 156 interfaces with the Notify application server and is used to deliver messages and file attachments as e-mail. The fax machine interface 157 interfaces with the fax application server and is used to deliver graphics. The Product Delivery Center (PDC) interface 158 interfaces with the print, tape and CD application servers and is used to produce and deliver hard media (tapes, prints, CD's) to customers. The web server 159 interfaces with the web application server and the web dropbox application server and is used to deliver data to the customers over the web.

Figure 11:
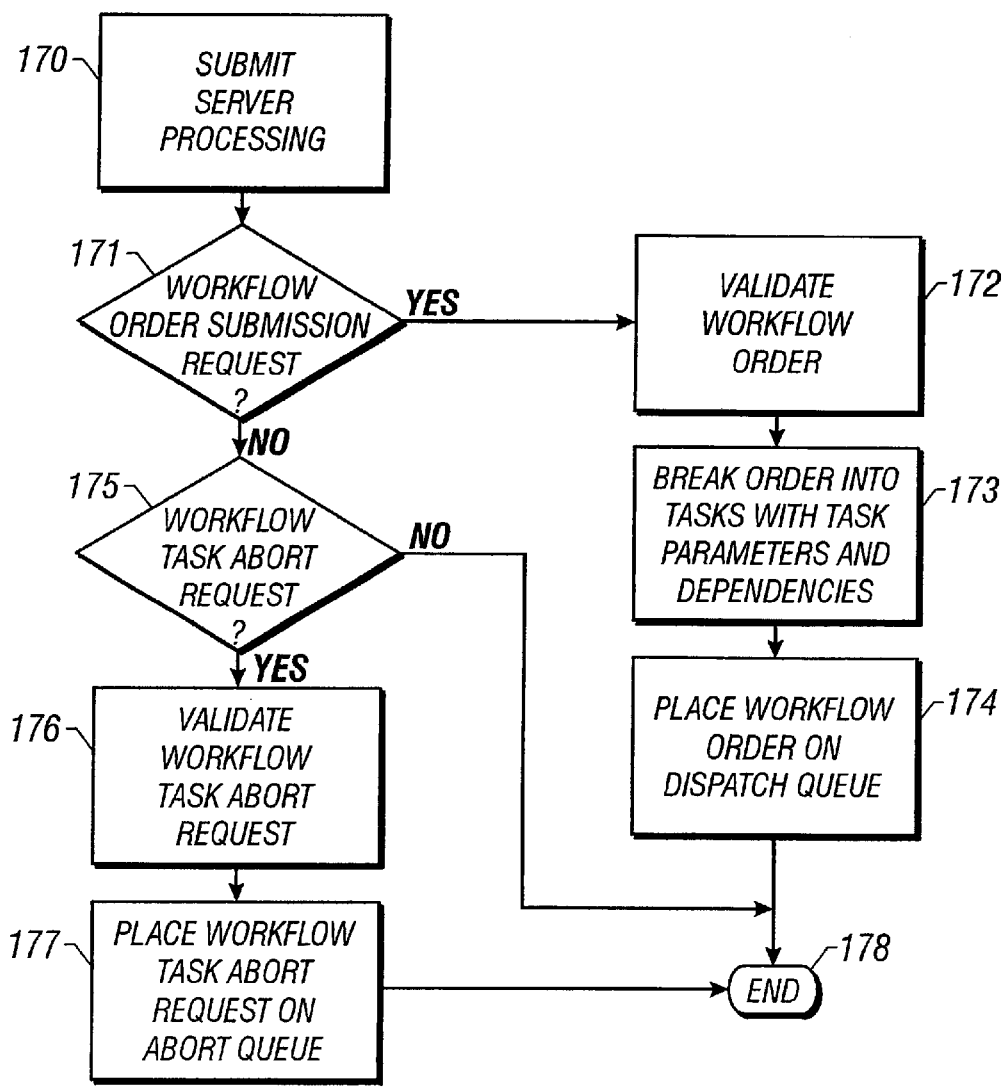
FIG. 11 is a flowchart of the submit server processing within the central data hub.

FIG. 11 is a flowchart of the submit server processing within the central data hub. In the submit server processing 170, if the workflow order is a submission request 171 received from the interface executable, the workflow order transmission is validated for integrity 172. The workflow order is broken into its constituent tasks 173, including the task parameters and any task dependencies. Task dependencies could include waiting for a certain time to process the workflow orders that are placed on the dispatch queue 174. If the workflow order is a task abort request 175, the workflow task abort request is validated for integrity 176 and placed on the abort queue 177. Submit processing ends 178.

Figure 12:
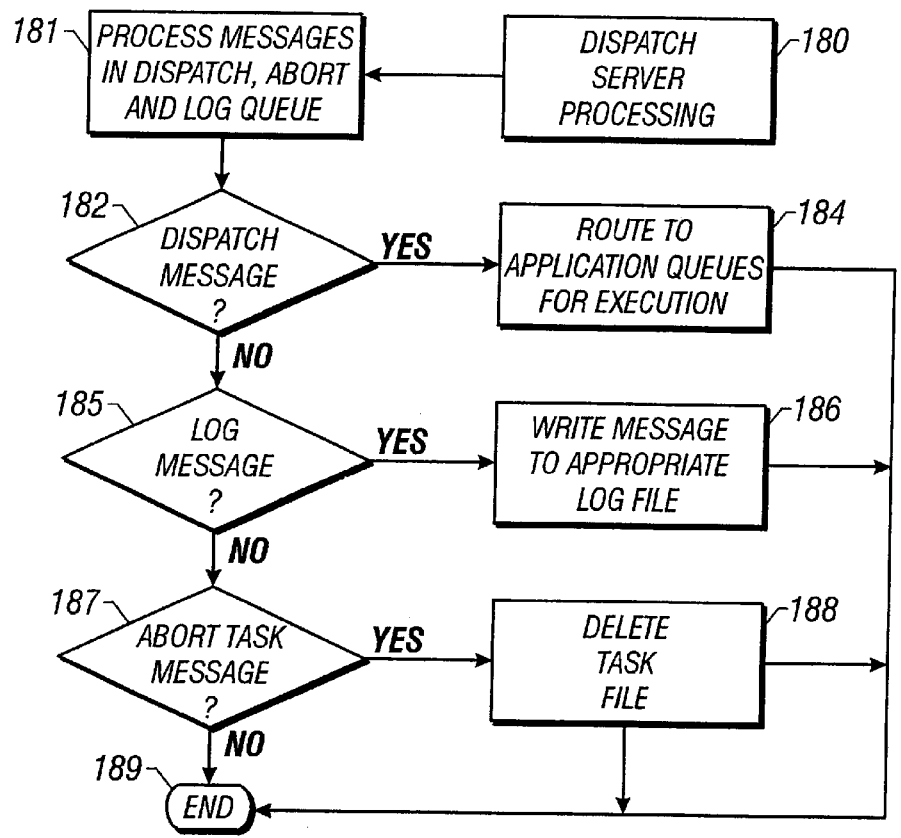
FIG. 12 is a flowchart of the dispatch server processing.

FIG. 12 is a flowchart of the dispatch server processing. In the dispatch sever 180, messages in the dispatch, abort and log queues are processed 181. If the message is a dispatch 182, the message is routed to the appropriate application queues for execution 184. If the message is a log message 185, the message is written to the appropriate log file 186. If the message is an abort task message 187, the task file is deleted 188. Processing ends step 189.

Figure 13:
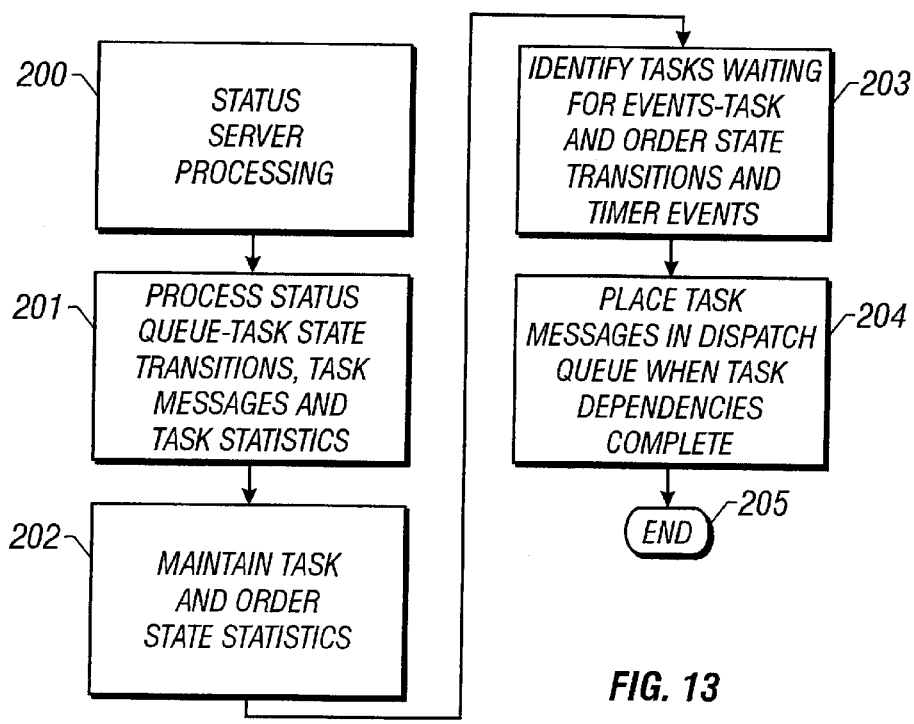
FIG. 13 is a flowchart of the status sever processing.

FIG. 13 is flowchart of the status server processing. In the status server 200, the status queue is processed which includes processing task state transitions, task messages and task statistics 201. The status server maintains task and workflow order state statistics 202. It identifies tasks waiting for events such as task and order state transitions and timer events 203. It places the task messages in dispatch queue when task dependencies are complete 204 and processing ends 205.

Figure 14:
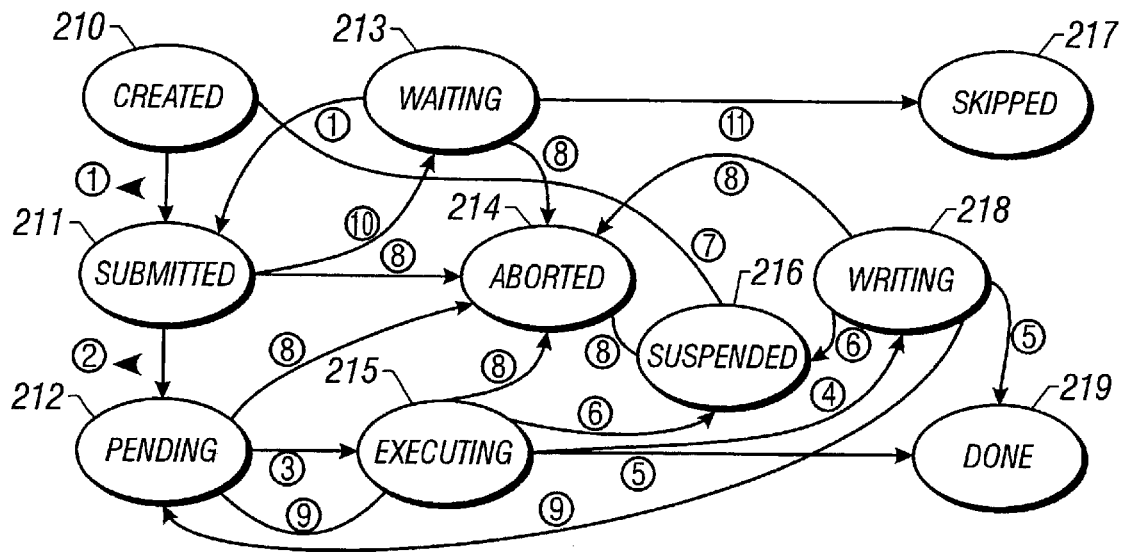
FIG. 14 is a diagram of the task state transitions maintained by the status server.

FIG. 14 is a diagram of the task state transitions maintained by the status server. The task states include created 210, submitted 211, pending 212, waiting 213, aborted 214, executing 215, suspended 216, skipped 217, writing 218 and done 219.

Figure 15:
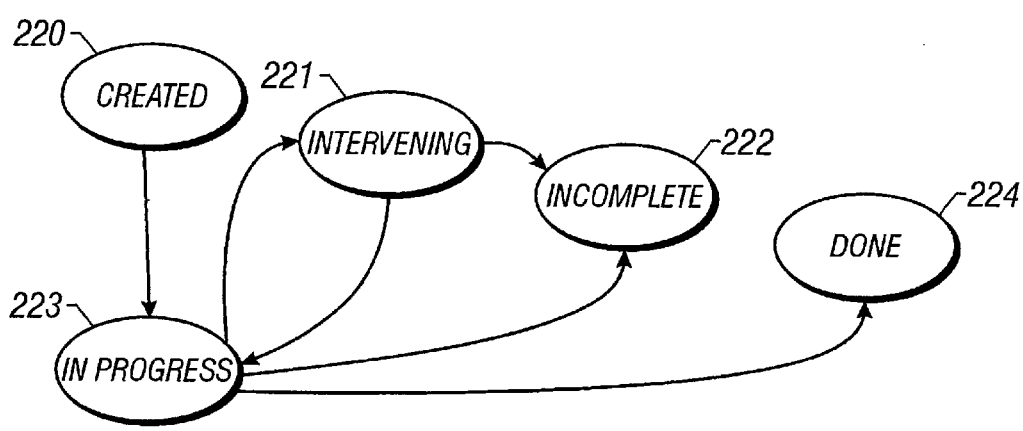
FIG. 15 is a diagram of the order state transitions maintained by the status server.

FIG. 15 is a diagram of the order state transitions maintained by the status server. The order states include created 220, intervening 221, incomplete 222, in progress 223 and done 224.

Figure 16:
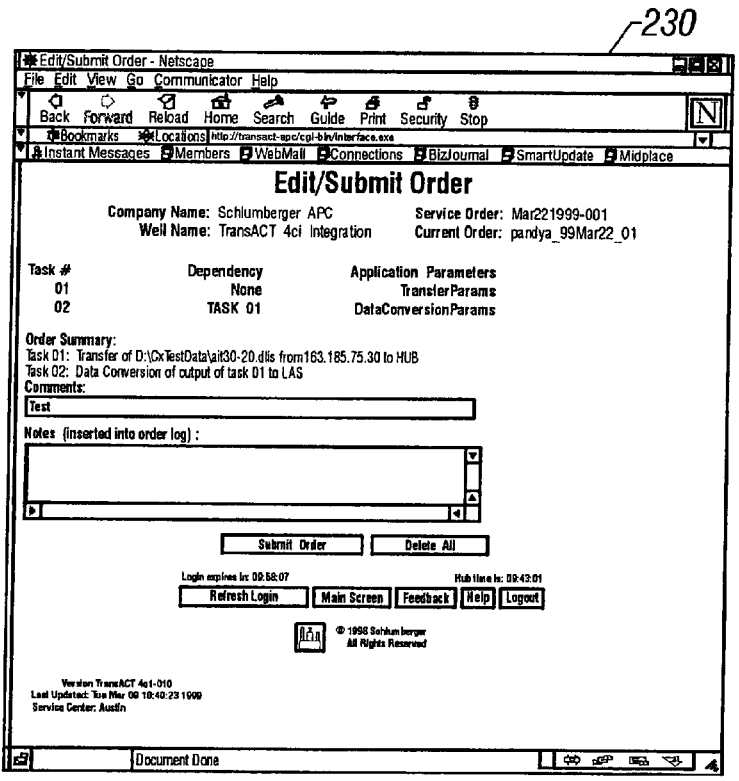
FIG. 16 is an exemplary display of a user interface for ordering and submitting a workflow order.

FIG. 16 is an exemplary display of a user interface for ordering and submitting a workflow order. The user interface 230 displays a list of tasks, gives access to parameters and dependencies for each task in the workflow order and gives access to order submission.

Figure 17:
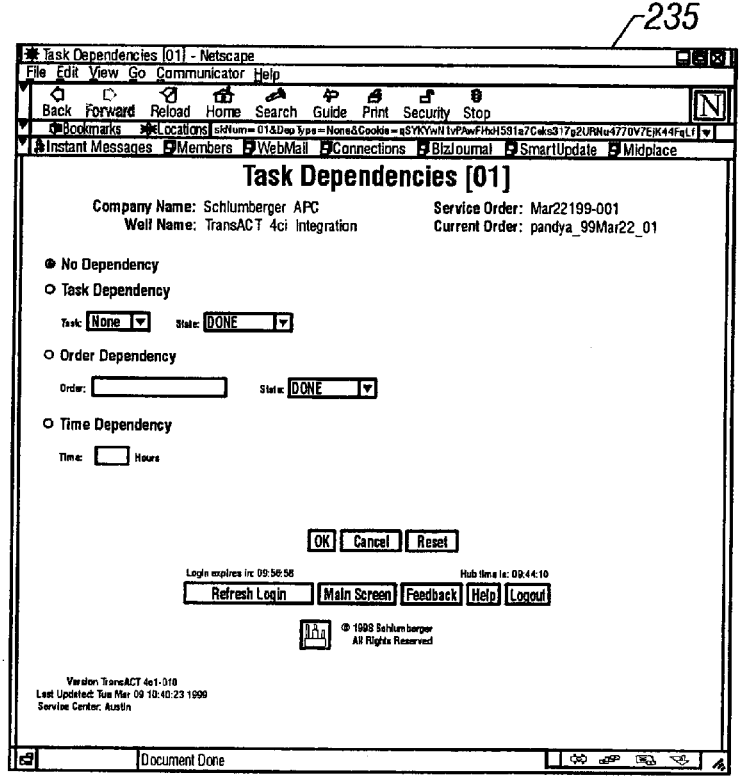
FIG. 17 is an exemplary display of a user interface for specifying and displaying tasks dependencies for tasks in the workflow order.

FIG. 17 is an exemplary display of a user interface for specifying and displaying task dependencies for tasks in the workflow order. The user interface 235 displays a list of task dependencies that affect the time when a task is executed. It may include three types of dependencies: task where execution is delayed until a given task enters a specific state; order where task execution is delayed until a given order enters a specific state; and time where task execution is delayed until a specified duration elapses.

Figure 18:
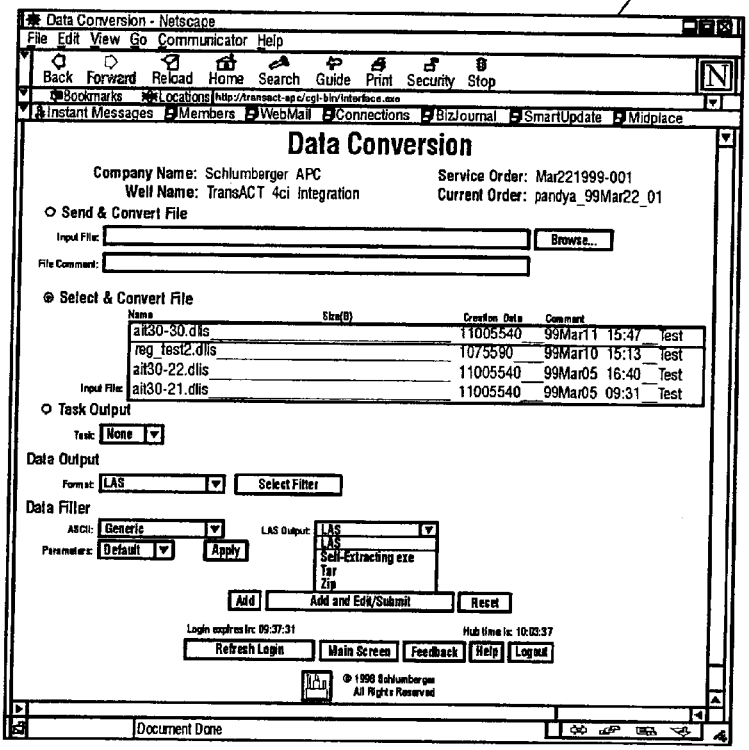
FIG. 18 is an exemplary display of a user interface for specifying data conversion for the workflow order.

FIG. 18 is an exemplary display of a user interface for specifying data conversion for the workflow order 236. The user can select the input file form three available options: send, select or task output. The user can select the output format, select a company specific filter and specify any special format parameter changes.

Figure 19:
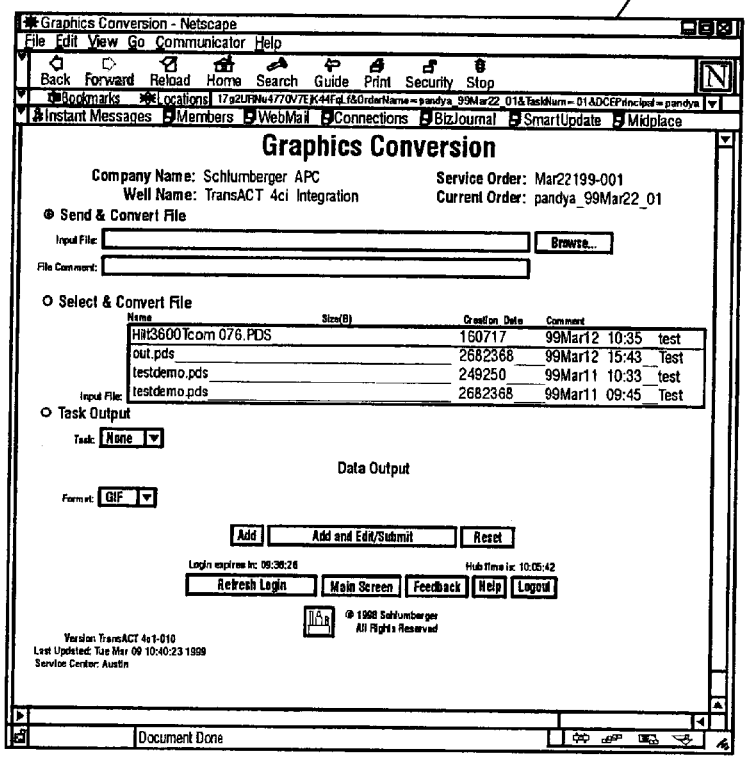
FIG. 19 is an exemplary display of a user interface for specifying graphics conversion for the workflow order.

FIG. 19 is an exemplary display of a user interface for specifying graphics conversion for the workflow order 237. The user can select the input file from three available options: send, select or task output and can select the output graphics conversion format.

Figure 20:
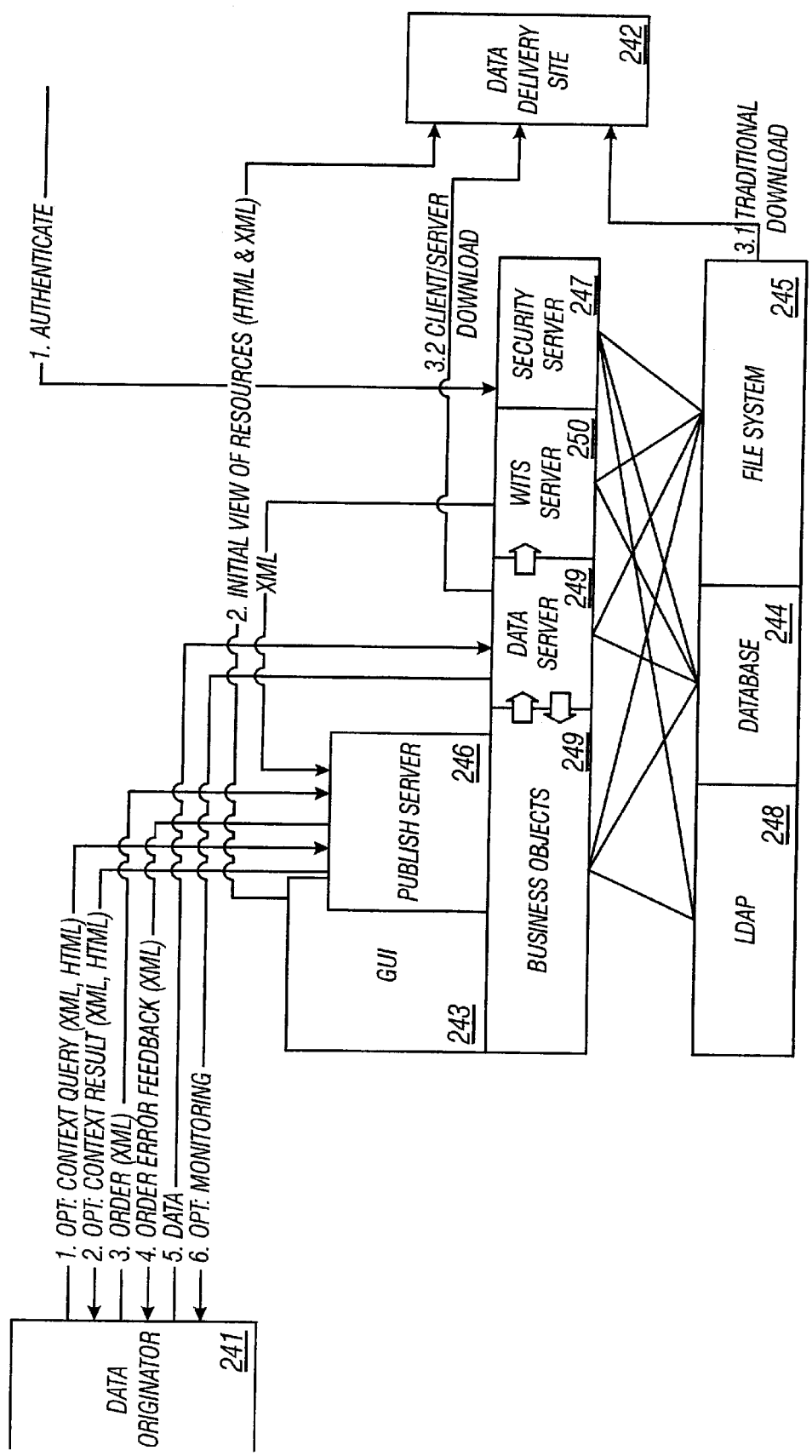
FIG. 20 is an architectural diagram of the electronic data hub.

FIG. 20 is an architectural diagram of the eHub. The eHub 240 accepts data from data originators 241 (such as client delivery sites, data acquisition sites, the central data hub and the like) and transfers data to data delivery sites 242. The graphical user interface provides a view into the eHub database 244 that contains a data catalog of the database contents and file system 245. Individual user applications can develop application specific views which can then be integrated into the eHub framework. Most user interfaces to the eHub 240, with the exception of some administration tools, are web-based interfaces. The primary means for locating data at the eHub is through a hierarchy that comprises a folder organization similar to that used by Microsoft's Windows Explorer. The eHub 240 defines the top levels of the hierarchy with sub-trees refined by the requirements of the applications. The eHub database and its catalog can be searched by a search engine since every data item in the eHub catalog 244 is defined by a set of attributes which varies for each data type. Using the search interface, a user is able to specify values for various attributes. After the search is submitted, a result list is presented with all matching data items. If a matching item is a folder, it is possible to navigate the hierarchy below it from the search results. Non-folders will be displayed as regular items with their attributes and will be downloaded when selected. Selecting a file data item, either via the hierarchical or the search results interface, will cause the file to be downloaded using the HTTPS transport. If the customer has established file associations in his/her web browser, the appropriate application will be automatically launched after the file is downloaded. A preview feature (showing a subset or reduced image of the data through the Web interface) is included as well as a catalog view feature (either hierarchical or search) which displays data attributes and aids in data identification. In addition to file data items, the eHub hierarchical interface also host links to applications. An application is defined as a set of web pages and/or associated server and/or client side code that implements business line-specific navigation and/or behavior. The eHub has a user interface (web-based) that gives access to the following features: adding a new data item or folder to the eHub catalog, specifying attributes and optionally access control, and transferring the data (e.g. files) from the publishing system from the eHub; modifying the attributes or access control of an existing catalog data item or folder; moving a data item or folder from one place in the hierarchy to another and removing a data item/folder from the catalog (removing a folder will implicitly remove all items under it). The eHub will provide through its user interface access to several user support features: documentation and site guides, on-line help, technical support gateways (e-mail, phone, etc.) and problem reporting.

The publishing server 246 allows for the entering of new data descriptions into the eHub catalog, physically moving the data (e.g. files) to the eHub system, and manipulating existing entries in the catalog. This process is carried out through the publishing interface, which governs the interaction between the Data Originator 241, which supplies new content or modifications, and the Publish Server 246, which is the entity responsible for entering the information in the catalog and/or manipulating it. The publishing process is divided into several steps. All messages from the Data Originator 241 to the Publishing server 246 are normally in Extensible Markup Language (XML) format, except for the actual data transfer. A context query is an optional step, which may be used by the Data Originator 241 to get information about the eHub catalog; i.e. what folders are available (wells, customers, and the like). This information can be used to facilitate human interaction (for example, to display a hierarchy to be published into). It can also be used to monitor the state of items in the catalog (number of bytes, whether data transfer had errors, etc.). The query result is an optional step that carries the results of the query back to the Data Originator 241. The publish request is a description of the data item(s) to be published, for example, the meta-data. It includes information about where in the hierarchy each item is located, the item data types and the set of associated attributes. In a non-transactional request, items that are error-free are entered into the catalog, and the ones in error are reported back to the Data Originator 241. Yet another mode is provided, "Publish Proposal", which will not enter any information in the catalog. This can be used to pre-validate a publish operation. In addition to entering new data, publish requests can also modify existing data (e.g. change the attributes of an existing request, creating a folder, deleting an item, etc.). This is done by identifying the item(s) to be modified (e.g. by unique ID), and a description of the requested modification (change of attributes, access control, parent container, etc.). The request result is a message that contains a per-item publish result (success or failure, and if failure, a human-readable description of the reason). In the data transfer step, the originator transfers the file(s) associated with the publish request. The transfer monitor follows the progress of the data transfer in order to respond to failure conditions, or to signal events. Standard protocols may be used (such as HTTP, FTP and the like), but for real-time data transfer the only option currently available is a company proprietary software application such as transfer express. Whatever the protocol, it must support authentication, since publishing operations will be access controlled.

Security features of the eHub 240 may be deployed in two distinct types of configurations: Internet and Intranet accessible. In the Internet accessible configuration the eHub 240 is located in an enclave providing the following services: access from the Internet, protected by firewalls that restrict traffic to known ports/protocols (for example HTTPS; note that these firewalls would not be configured to do IP-address-based filtering) and detect common attacks such as denial-of-service; direct connections from customer's networks via dedicated high-bandwidth links, and dial-up access, protected by firewalls in a manner similar to the Internet connection; and access from company proprietary Intranets, also protected via screening firewalls. Users (customers, administrators, and the like) do not need to authenticate to the enclave, only to the eHub (for example, an anonymous web Internet connection should be allowed to reach the eHub, which will perform authentication at that point). The Intranet accessible configuration is available for customers who do not find the Internet option acceptable because the customer is not satisfied with the security measures, finds Internet access inconvenient, or has a strong network infrastructure with poor Internet connectivity. In any case, the eHub will be installed in the customer's Intranet, to be accessed only from within the customer's network.

System and network security can be accomplished by separating the data and application repository from the system that is physically outside of the Intranet network. In this configuration, the system that is externally accessible is only a "front" for the "real" eHub, which is located in an Intranet, benefiting from the Intranet security features. An industry-standard approach for achieving this configuration is through the use of Proxy Servers. A Proxy Server is simply an agent that relays specific protocol traffic (typically only HTTP and FTP) between a client and a server.

Operating System and Web Server Hardening

By default, NT Servers are not configured as a secure system that can be placed in the Internet environment. In this respect, it is no different from other operating systems that are designed primarily to operate in the Intranet, and are not setup by default to deal with many of the threats present in the external network. The process of identifying and closing the security gaps in the OS default configuration is called "OS hardening". Web servers, which are layered network applications, also need to be especially configured for security. The eHub project has procedure to follow to strengthen the NT and IIS security frameworks, with the goal of resisting many common attacks. This procedure will be based on existing literature, which is quite extensive. Secure access to Intranets to deliver data to the eHub via the central data hub may include deploying Virtual Private Networks (VPNs).

Users are authenticated to the eHub by supplying a user name and password, which will be encrypted in HTTPS. Users will need to authenticate once at the beginning of a session. As long as a session remains active the user will not need to authenticate again. A session may be terminated due to lack of activity (e.g. no HTTP requests in 20 minutes), or explicitly by the user through the web interface. The user database is kept in the Lightweight Directory Access Protocol (LDAP) 248 that is a network protocol for accessing directory repositories.

All published data is access-controlled. Administrators and publishers cooperate to specify who has access to the data. The basic access model is the following: when a user authenticates, the eHub determines what groups the user belongs to (this information is kept in LDAP 248). Resources (folders or files) are tagged with an access control list (ACL), which is typically a list of groups. When the user attempts to access a resource, the eHub compares the user group list with the ACL. If a matching entry exists, the user is assumed to have access to the resource. A resource's visibility will be controlled as well: a user will not see in the interface any resources to which the user does not have access.

Access control is simple yet flexible. The eHub does not require that a human explicitly set access control for every published item. To facilitate this, the eHub takes advantage of the organizational hierarchy to provide default ACL's. For example, a file resource may not have an explicit associated ACL. In this case, when a user attempts to access the file resource, the eHub will determine accessibility by looking at the ACL of the parent folder. If the parent also does not have an explicit ACL, the process is repeated up the ancestor chain until an ACL is found, or a root element is reached.

For data privacy, traffic to/from the eHub 240 will be encrypted using industry-standard HTTPS. The business objects 249 manage the eHub data.

Real-time data delivery is handled in the eHub 240 by the real-time data server 249. There are two aspects to real-time data delivery. First, on the server side, real-time implies that the content being delivered is not static (such as a web page or a Word document), but is generated incrementally based on information continually provided to the web server. This can be understood as a dynamic content generation engine (e.g. CGI, ASP, or Java Servlet) that is reading information from a continuously-updated source (e.g. a growing serial file, or a database) and passing it on to the client over the HTTP(S) stream. Second, on the client side, real-time implies that the HTTP(S) stream is made available as it is received to a client-side application or component (such as a log viewer, or numerical display).

A key feature of the above system is that data is serialized before being delivered to the client. This implies not only a serialization component on the server side, but also cooperation between the producer and the consumer of the stream. For certain types of data, such as serial files, serialization is a trivial task. Other sources, like databases, could require significant design work.

Th eHub provides two solutions. It defines the architecture for delivering a data stream from the eHub to the customer's desktop in a secure manner. The architecture consists of the following:

- a server-side interface for stream providers. An application implements this interface to serialize server-side data;
- a means of identifying a server-side data provider (for example, database, serial file, numerical status, etc.) in the URL;
- a single implementation for determining access control to stream sources, based on information contained in the URL, so applications do not have to implement their own access control checking;
- support for HTTPS as the transport protocol, to provide data privacy;
- centralized logging of data access for security auditing purposes; and
- a client-side (web-browser-hosted) interface for stream receivers. An application would implement this interface to handle the serialized stream and take appropriate client-side action (for example, write to a file, update a numerical display, etc.).

Based on this infrastructure, the eHub provides a set of implementations that will allow delivering a serial file in real-time from the eHub to the customer's desktop, following the read-while-write (RWW) protocol, and launching a client-side application that can make use of the real-time file (such as PDSView).

Specific Application Hosting includes supporting web data delivery in real-time. Application code will be able to register for event notification and processing, and for executing handling code. For Web data delivery (WebDD), the event of interest is when a WITS data item is added to the catalog and the action is to prepare the WITS receiver for the new data. This processing occurs in the WITS server 250. The notification includes references to the physical data item (file specification) and to the meta-data. The event notification model allows any application to listen for significant eHub events and react accordingly. The eHub application framework will include an interface for obtaining the end user identity (user name, LDAP attributes, etc.).

Applications are able to use the infrastructure. In particular, WebDD is able to query the eHub for resource permissions. At a basic level, the eHub exposes access control of resources it knows about. An application will be able to ask whether a user has access to a file, and the eHub implements the lookup algorithm. A more general approach is to allow an application to create its own access controlled resources, and have them managed by the eHub access control system (for example, data channels inside WebDD).

Applications are visible as links in the eHub hierarchical view of the catalog, perhaps even becoming actual catalog entries. These links need to have enough information (e.g. via URL parameters) so that when the application is launched, it has all it needs to know to provide the user with the desired view. The information needed to launch an application such as WebDD (URL, parameters that need to be passed, etc.) will be stored in the catalog entry for the application.

The central data hub is one of the primary sources of data for the eHub 240. As such, it is adapted to interface to the eHub as a data originator. An "eHub" application is added to the central data hub that allows the placing of files (either on the data acquisition system or at the central data hub) into an eHub publishing request. The request will include additional information, such as metadata required in the publishing interface. The validation step of the central data hub/eHub application will be a "Publish Proposal" request to verify the meta-data description is correct (for example, well name, customer, etc.), which should increase the likelihood of an error-free publication. The active request will be issued in the central data hub/eHub application runtime, which will act as the data originator. Results of the publish request will be used to determine the central data hub task state, which will allow user intervention when necessary. Data transfer will follow the publish request using a protocol such as a company proprietary software application such as transfer express.

The eHub contains two types of administration interfaces: those that are embedded in the user views, and those that are part of special tools. Embedded interfaces include, for example, ACL management, which could be presented as additional, administrator-only, items in the standard hierarchical catalog view. The eHub provides administrator user interfaces for creating, modifying and deleting user entries. It allows for the management of user groups and associating them with user entries. An account creation request is started with the potential new user submitting a form to the eHub that contains all the information required to create the account. The request contains a reference to an agent trusted by the eHub administrator. The eHub administrator receives the request (e.g. via e-mail) and verifies the information with the trusted agent, revising it as needed (e.g. group membership), and creates the account. Users manage their own passwords. Password checking is supported (minimum length and enforce numeric characters). The main features of content management are access control, quality maintenance and data offloading. Administrators will be provided with a user interface for viewing and setting access control on any eHub resource. The interface will allow the administrator to select any resource (well, bit run, file, application, and the like); it will show who is the owner of the resource, which groups and users have access to it, and what type of access they have. It will also show whether the access control is explicit on the resource, or whether it is inherited from a folder. Administrators are able to add/remove groups from an explicit access list, remove an access list (so that access is derived from the folder), or create an access list if a resource does not have one and manage access through a password change utility. Resource editors allow users to create, edit and delete resources such as customer, well and fax machine. It allows the eHub administrators to create, edit and delete resources such as the dropbox, eHub, data center and transfer resources. The change context utility allows for the modification of the company/well focus in the session to the central hub. A user editor allows administrators to create, edit and delete user records. A cleanup utility allows administrators to archive old order records and remove file data from the system without the loss of an audit trail. A change applications utility allows administrators to customize which applications are available in the user interface for a given central eHub. The change fax routing allows administrators to determine the origin of the fax deliveries, either form the central hub or a remote fax unit of the eHub. The server manager allows administrators to control the back end servers of the eHub.

Quality maintenance activities include revising attributes of published data, moving content within the hierarchy and removing content. Administrators are provided with a user interface to accomplish these tasks. This user interface will in turn interact with the publishing application interface catalog modifications.

Data offloading is the removal of catalog entries and freeing-up of associated resources (files, etc.). Administrators are allocated tools for performing manual removal, and for configuring automated removal of entries based on attributes (age, size, last time accessed, etc.).

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A data delivery system for delivering oilfield data from at least one data acquisition site to a remote delivery site, comprising:
   a. a central data hub computer that processes a workflow order that controls delivery of oilfield data from the at least one data acquisition site to a remote delivery site;
   b. a data acquisition site computer that transmits oilfield data over a first communications network to the central data hub computer in near-real-time in response to the workflow order; and
   c. a data server that receives data from the central data hub over a second communications network, the data server communicating with multiple remote delivery site computers for the simultaneous display of the oilfield data in near real time at the multiple delivery site computers in response to the workflow order.

2. The system of claim 1 further comprising a workflow order generating module in the central data hub computer that allows a user to generate and submit the workflow order to the central data hub computer for processing.

3. The system of claim 2 further comprising a workflow order status monitoring module in the central data hub computer that monitors the status of a submitted workflow order.

4. The system of claim 1 further comprising a data services center computer for post-acquisition oilfield data processing, the data services center computer being in communication with the central data hub.

5. The system of claim 4 further comprising post-acquisition oilfield data processing software applications within the data services center computer, the software applications being selected from the group consisting of borehole seismic applications, borehole imaging applications, petrophysics applications, well test applications, production engineering processing applications and interpretation functionality applications.

6. The system of claim 1 further comprising an oilfield data archival database in communication with the central data hub.

7. The system of claim 1 wherein the data server comprises a File Transfer Protocol (FTP) data server for transmitting oilfield data to at least one remote delivery site computer.

8. The system of claim 1 wherein the data server comprises a global communications network ("web") data server capable of transmitting oilfield data in near real-time to the multiple remote delivery site computers via a global communications network.

9. The system of claim 1 wherein the data server comprises a real-time data server for transmitting oilfield data to multiple delivery site computers in near real-time via a third communications network.

10. The system of claim 9 wherein the third communications network comprises a communications link and a communications protocol.

11. The system of claim 10 wherein the third communications network is a global communications network.

12. The system of claim 10 wherein the communications protocol is Transmission Control Protocol/Internet Protocol (TCP/IP).

13. The system of claim 9 wherein the communications protocol is HyperText Transfer Protocol (HTTP).

14. The system of claim 9 wherein the second and the third communications networks comprise a real-time communications transfer protocol.

15. The system of claim 9 wherein the third communications network comprises a real-time data transfer capability using a HyperText Transfer Protocol (HTTP).

16. The system of claim 1 wherein the first communications network comprises a satellite communication network.

17. The system of claim 1 wherein the first communications network comprises a telephone communication network.

18. The system of claim 1 wherein the first communications network comprises a microwave transmission network.

19. The system of claim 1 wherein the first communications network comprises a radio communication network.

20. The system of claim 1 wherein the first communications network comprises a wireless telephone communication network.

21. The system of claim 1 wherein the first communications network comprises a TCP/IP communications protocol.

22. The system of claim 1 further comprising a hardcopy delivery center, that generates a hardcopy of the oilfield data as controlled by the workflow order from the central data hub, in communication with the central data hub.

23. The system of claim 22 wherein the hardcopy is stored on media selected from the group consisting of a hardcopy report, a tape, a film and a CD-ROM.

24. The system of claim 1 wherein the central data hub comprises:
   a. a user interface module that receives a user generated workflow order for oilfield data;
   b. a submission module that loads a description of the workflow order and breaks the workflow order into at least one task containing task parameters and task dependencies and transfers the task to a dispatch module for routing the task;
   c. at least one application module that executes the routed task;
   d. a status module that maintains the task dependencies and monitors task status;
   e. a data manager module that enter soilfield data in a database accessible by the central data hub; and
   f. an archive manager module that handles the export of information for archival.

25. The system of claim 24 further comprising a real-time data transfer module for transmitting real time data as specified in the workflow order from a data acquisition site to a data delivery site.

26. The system of claim 25 wherein the real-time data transfer module comprises a transfer express communications transmission protocol.

27. The system of claim 24 wherein the user-interface module interfaces with a web browser for receiving t he workflow order.

28. The system of claim 24 wherein the application module comprises a data converter function that provides digital data conversion and data filtering of oilfield data as specified in the workflow order.

29. The system of claim 24 wherein the application module comprises a fax function.

30. The system of claim 24 wherein the application module comprises publishing, the oilfield data to a web server as specified in the workflow order.

31. The system of claim 24 wherein the application module comprises sending the oilfield data as specified in the workflow order to an external server using an FTP protocol.

32. The system of claim 24 wherein the application module comprises sending e-mail messages to a computer server as specified in the workflow order.

33. The system of claim 24 wherein the application module comprises a data conversion function for converting graphics data as required in the workflow order.

34. The system of claim 24 wherein the application module comprises a function for sending a hardcopy request to a product delivery center.

35. The system of claim 24 further comprising a real-time application module in communication with the central data hub for sending oilfield data in real time from the data acquisition site to multiple remote delivery sites.

36. The system of claim 35 wherein the application module comprises a real-time oilfield data transfer function that sends data to and receives data from the real-time module.

37. A computer-implemented method for near real-time data delivery of oilfield data from at least one data acquisition site to a remote delivery site, comprising:
   a. processing a workflow order at a central data hub computer that controls delivery of oilfield data from the at least one data acquisition site to the remote delivery site;
   b. transmitting oilfield data over a first communications network from a data acquisition site computer to the central data hub computer in near real-time in response to the workflow order;
   c. sending oilfield data from the central data hub to a data server over a second communications network; and
   d. receiving data from the central data hub at the data server, the data server having the capability of communicating with multiple remote delivery site computers for the simultaneous display of the oilfield data in near real time at multiple delivery site computers in response to the workflow order.

38. The method of claim 37, further comprising allowing a user to generate and submit the workflow order to the central data hub computer for processing using a workflow order generating module in the central data hub computer.

39. The method of claim 37 further comprising monitoring the status of a submitted workflow order using a workflow order status monitoring module in the central data hub computer.

40. The method of claim 37 further comprising performing post-acquisition oilfield data processing at a data services center computer which is in communication with the central data hub.

41. The method of claim 37 further comprising archiving oilfield data in an archival database in communication with the central data hub.

42. The method of claim 37 further comprising transmitting oilfield data in near real-time via the data server to the multiple remote delivery site computers via a global communications network.

43. The method of claim 42 wherein the data server is a global communications network ("web") data server.

44. The method of claim 37 further comprising transmitting oilfield data in near real-time from a real-time data server to the multiple delivery site computers via a third communications network.

45. The method of claim 44 further comprising a data compression module for compressing data transmitted over the first, second and third communications networks.

46. The method of claim 37 wherein the first communications network is selected from the group consisting of a satellite communication network, a telephone communication network, a microwave transmission network, a radio communication network and a wireless telephone communication network.

47. The method of claim 37 further comprising, in accordance with the workflow order, generating a hardcopy of the oilfield data at a hardcopy delivery center in communication with the central data hub.

48. The method of claim 37 wherein processing the workflow order at the central data hub comprises:
   a. receiving a user generated workflow order for oilfield data at the central data hub;
   b. loading a description of the workflow order and breaking the workflow order into at least one task containing task parameters and task dependencies and transferring the task to a dispatch module for routing the task;

c. executing the routed task;

d. maintaining the task dependencies and monitoring task status;

e. entering oilfield data in a database accessible by the central data hub; and f. handling the export of information for archival.

49. The method of claim 48 wherein the user generated workflow order is received by a user-interface module interfacing with a web browser.

50. The method of claim 48 wherein an application module executes the routed task.

51. The method of claim 50 wherein the application module comprises converting digital oilfield data and filtering the data as specified in the workflow order.

52. The method of claim 50 wherein the application module comprises publishing the oilfield data to a web server as specified in the workflow order.

53. The method of claim 50 wherein the application module comprises sending the oilfield data as specified in the workflow to an external server using an FTP protocol.

54. The method of claim 50 wherein the application module comprises sending e-mail messages to a computer server as specified in the workflow order.

55. The method of claim 50 wherein the application module comprises sending a hardcopy request to a product delivery center.

56. The method of claim 50 wherein the application module comprises sending oil field data in near real-time data from the data acquisition site to the multiple remote delivery sites.

57. The method of claim 46 further comprising sending oilfield data in near real-time from the data acquisition site to the multiple remote delivery sites as specified in the workflow order.

58. The method of claim 48 further comprising a built-in data recovery module in the central data hub for recovering data if the transmitting of the oilfield data from the data acquisition system to the multiple remote delivery sites fails.

59. A software program embodied on a computer-readable medium incorporating the method as recited in claim 37.

60. A method in a computer data delivery system for delivering oilfield data from at least one data acquisition site to multiple delivery sites comprising:

a. receiving a workflow order for oilfield data at a central data hub computer;

b. executing the received workflow order at the central data hub computer comprising:
  i. if the task parameters are valid, submitting the task for dispatch comprising:
    1. loading the description of the workflow order;
    2. breaking the workflow order into at least one task containing task parameters and task dependencies;
  ii. if task dependencies are satisfied dispatching the task for execution;
  iii. executing the task; and
  iv. monitoring task status.

61. The method of claim 60 wherein submitting the task comprises:

a. receiving a workflow order request at a submit server within the central data hub;

b. validating the workflow order; and c. placing the workflow order on a dispatch queue.

62. The method of claim 60 further comprising if the workflow order is a task abort request:

a. receiving a workflow order request at a submit server within the central data hub;

b. validating the workflow order; and c. placing the workflow order on an abort queue.

63. The method of claim 60 wherein dispatching and executing the task comprises processing tasks in a dispatch queue by routing the task to an appropriate application server for execution.

64. The method of claim 63 wherein the application server comprises a digital data conversion and filter application.

65. The method of claim 63 wherein the application server comprises a web dropbox server for sending data to a web server.

66. The method of claim 63 wherein the application server comprises a fax application server for sending the oilfield data to a fax machine.

67. The method of claim 63 wherein the application server comprises a file transfer protocol (FTP) server for sending files to a server external to the central data hub using FTP protocol.

68. The method of claim 63 wherein the application server comprises a PDS rasterize application server for converting data from PDS graphical formats to other graphical formats.

69. The method of claim 63 wherein the application server comprises a hardcopy server for sending a hardcopy requests to a product delivery center.

70. The method of claim 59 wherein the application server comprises a real-time transfer application server that sends data to and receives data from a real-time server.

71. The method of claim 70 further comprising a second real-time transfer application server in the data acquisition system for sending oilfield data in real-time to the central data hub.

72. The method of claim 70 further comprising a third real-time transfer application server in the remote delivery site computer for receiving oilfield data in real-time from the central data hub.

73. The method of claim 70 wherein the real-time transfer application server establishes a real-time data transfer chain from the data acquisition system to a real-time transfer-enabled remote delivery site.

74. The method of claim 73 wherein the real-time transfer-enabled remote delivery site comprises a real-time transfer utility located within a remote delivery site computer.

75. The method of claim 60 further comprising a data manager within the central data hub that locates data and enters new data into a database in communication with the central data hub.

76. The method of claim 60 further comprising an archive manager for managing file data uploaded to the central data hub and file data generated at the central data hub via file conversion applications.

77. The method of claim 60 wherein the monitoring of the task status comprises:

a. processing status queue task dependencies, task messages and task statistics:

b. maintaining task and order state statistics;

c. identifying task waiting for events; and d. placing tasks in a dispatch queue when task dependencies are complete.

78. The method of claim 60 wherein task dependencies comprise executing the task after other tasks have reached their target state.

79. The method of claim 60 wherein task dependencies comprise executing the task after a period of time has elapsed.

80. The method of claim 60 further comprising specifying the workflow order by a user at a user computer and sending the workflow order to the central data hub for processing.

81. A software program embodied on a computer-readable medium incorporating the method as recited in claim 60.

82. A computer-implemented method for near real-time data delivery of oilfield data from at least one data acquisition site to multiple remote delivery sites, comprising:
   a. processing a workflow order at a central data hub computer that controls delivery of oilfield data from the at least one data acquisition site to the remote delivery site;
   b. transmitting oilfield data over a first communications network from a data acquisition site computer to the central data hub computer in near real-time in response to the workflow order; and
   c. sending oilfield data from the central data hub to a remote delivery site using a data server that is part of the central data hub, the data server communicating with multiple remote delivery site computers for the simultaneous display of the oilfield data in near real time at multiple delivery site computers in response to the workflow order.

83. A computer implemented method for near real-time data delivery of oilfield data from at least one data acquisition site to multiple remote delivery sites, comprising:
   a. electronically transferring oilfield data obtained at a data acquisition site from a computer at the data acquisition site, based on a user-specified workflow order program, to a central data hub computer over a communications network using a near real-time transmission protocol;
   b. receiving the oilfield data at the central data hub computer, formatting the data for delivery to the multiple remote delivery sites based on the delivery site requirements and the user-specified workflow program;
   c. routing the data to a hardcopy delivery site for hardcopy creation based upon the workflow as requested by the workflow; and
   d. routing the data to the multiple remote delivery sites based on the user-specified workflow over a second communications network using a near real-time transmission protocol upon request by at least one of the multiple delivery sites.

84. A software program embodied on a computer-readable medium incorporating the method as recited in claim 83.

* * * * *